US012695883B1

(12) United States Patent
Cartwright

(10) Patent No.: US 12,695,883 B1
(45) Date of Patent: Jul. 28, 2026

(54) LOSSY VIDEO ENCODING FOR BATTERY-CONSTRAINED DEVICES

(71) Applicant: Snap Inc., Santa Monica, CA (US)

(72) Inventor: Luke Cartwright, New York, NY (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/804,713

(22) Filed: Aug. 14, 2024

(51) Int. Cl.
| | |
|---|---|
| *H04N 19/162* | (2014.01) |
| *H04N 19/172* | (2014.01) |
| *H04N 19/20* | (2014.01) |
| *H04N 19/42* | (2014.01) |
| *H04N 19/463* | (2014.01) |

(52) U.S. Cl.
CPC ......... *H04N 19/162* (2014.11); *H04N 19/172* (2014.11); *H04N 19/20* (2014.11); *H04N 19/42* (2014.11); *H04N 19/463* (2014.11)

(58) Field of Classification Search
CPC .... H04N 19/162; H04N 19/172; H04N 19/20; H04N 19/42; H04N 19/463
See application file for complete search history.

(56) References Cited

U.S. PATENT DOCUMENTS

| | | | | |
|---|---|---|---|---|
| 2019/0354174 | A1* | 11/2019 | Young | G06F 3/011 |
| 2021/0311307 | A1* | 10/2021 | Peri | G06F 3/011 |
| 2023/0409111 | A1* | 12/2023 | Babu J D | G06T 7/50 |
| 2024/0196065 | A1* | 6/2024 | Hamada | G06V 10/761 |

* cited by examiner

*Primary Examiner* — Shahan Ur Rahaman
(74) *Attorney, Agent, or Firm* — SCHWEGMAN LUNDBERG & WOESSNER, P.A.

(57) ABSTRACT

Systems, methods, and computer readable media for lossy video encoding for battery-constrained devices where the methods performed on a system include accessing a gaze location of a user viewing a first frame of a video on a wearable device, determining a first portion of a second frame based on the gaze location, compressing, in accordance with a first lossy compression standard, the first portion of the second frame to generate a first compressed portion of the second frame, compressing, in accordance with a second lossy compression standard a second portion of the second frame, to generate a second compressed portion of the second frame, the second portion comprising a portion of the second frame not included in the first portion, and causing the first compressed portion and the second compressed portion to be sent wirelessly to the wearable device.

20 Claims, 14 Drawing Sheets

1302 — ACCESSING A GAZE LOCATION OF A USER VIEWING A FIRST FRAME OF A VIDEO ON A WEARABLE DEVICE

1304 — DETERMINING A FIRST PORTION OF A SECOND FRAME BASED ON THE GAZE LOCATION

1306 — COMPRESSING, IN ACCORDANCE WITH A FIRST LOSSY COMPRESSION STANDARD, THE FIRST PORTION OF THE SECOND FRAME TO GENERATE A FIRST COMPRESSED PORTION OF THE SECOND FRAME

1308 — COMPRESSING, IN ACCORDANCE WITH A SECOND LOSSY COMPRESSION STANDARD A SECOND PORTION OF THE SECOND FRAME, TO GENERATE A SECOND COMPRESSED PORTION OF THE SECOND FRAME, THE SECOND PORTION COMPRISING A PORTION OF THE SECOND FRAME NOT INCLUDED IN THE FIRST PORTION

1310 — CAUSING THE FIRST COMPRESSED PORTION AND THE SECOND COMPRESSED PORTION TO BE SENT WIRELESSLY TO THE WEARABLE DEVICE

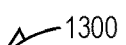

1302 ACCESSING A GAZE LOCATION OF A USER VIEWING A FIRST FRAME OF A VIDEO ON A WEARABLE DEVICE

1304 DETERMINING A FIRST PORTION OF A SECOND FRAME BASED ON THE GAZE LOCATION

1306 COMPRESSING, IN ACCORDANCE WITH A FIRST LOSSY COMPRESSION STANDARD, THE FIRST PORTION OF THE SECOND FRAME TO GENERATE A FIRST COMPRESSED PORTION OF THE SECOND FRAME

1308 COMPRESSING, IN ACCORDANCE WITH A SECOND LOSSY COMPRESSION STANDARD A SECOND PORTION OF THE SECOND FRAME, TO GENERATE A SECOND COMPRESSED PORTION OF THE SECOND FRAME, THE SECOND PORTION COMPRISING A PORTION OF THE SECOND FRAME NOT INCLUDED IN THE FIRST PORTION

1310 CAUSING THE FIRST COMPRESSED PORTION AND THE SECOND COMPRESSED PORTION TO BE SENT WIRELESSLY TO THE WEARABLE DEVICE

*FIG. 13*

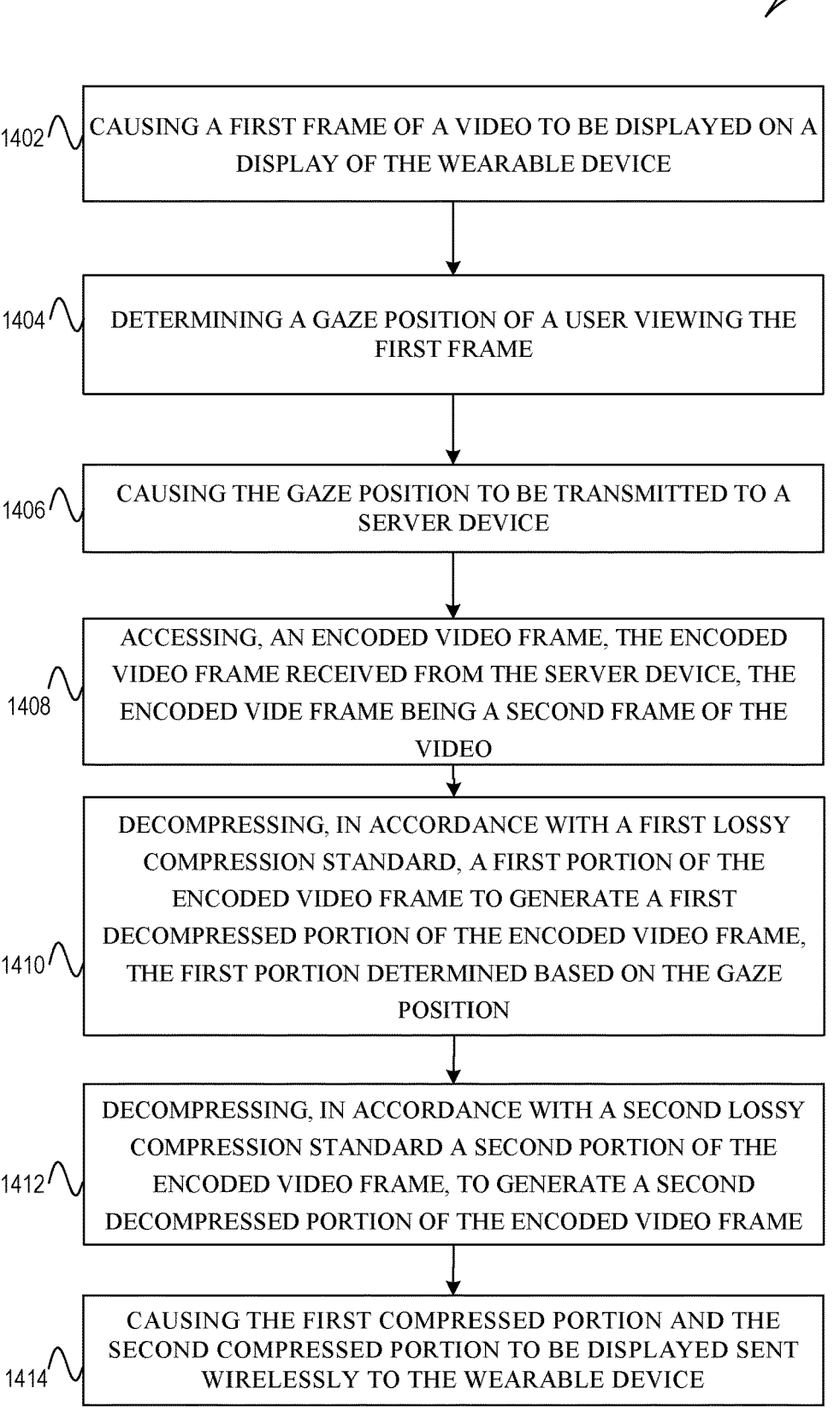

1400

1402 — CAUSING A FIRST FRAME OF A VIDEO TO BE DISPLAYED ON A DISPLAY OF THE WEARABLE DEVICE

1404 — DETERMINING A GAZE POSITION OF A USER VIEWING THE FIRST FRAME

1406 — CAUSING THE GAZE POSITION TO BE TRANSMITTED TO A SERVER DEVICE

1408 — ACCESSING, AN ENCODED VIDEO FRAME, THE ENCODED VIDEO FRAME RECEIVED FROM THE SERVER DEVICE, THE ENCODED VIDE FRAME BEING A SECOND FRAME OF THE VIDEO

1410 — DECOMPRESSING, IN ACCORDANCE WITH A FIRST LOSSY COMPRESSION STANDARD, A FIRST PORTION OF THE ENCODED VIDEO FRAME TO GENERATE A FIRST DECOMPRESSED PORTION OF THE ENCODED VIDEO FRAME, THE FIRST PORTION DETERMINED BASED ON THE GAZE POSITION

1412 — DECOMPRESSING, IN ACCORDANCE WITH A SECOND LOSSY COMPRESSION STANDARD A SECOND PORTION OF THE ENCODED VIDEO FRAME, TO GENERATE A SECOND DECOMPRESSED PORTION OF THE ENCODED VIDEO FRAME

1414 — CAUSING THE FIRST COMPRESSED PORTION AND THE SECOND COMPRESSED PORTION TO BE DISPLAYED SENT WIRELESSLY TO THE WEARABLE DEVICE

FIG. 14

LOSSY VIDEO ENCODING FOR BATTERY-CONSTRAINED DEVICES

TECHNICAL FIELD

Examples of the present disclosure relate generally to lossy video encoding for battery-constrained devices. More particularly, but not by way of limitation, examples of the present disclosure relate to a server system compressing frames of a video using different levels of lossy compression and transmitting the compressed frames to a battery-constrained device for display to a user. The server system compresses different portions of each frame using different levels of lossy compression based on gaze positions of the user, which are sent to the server system by the battery-constrained device.

BACKGROUND

Users of mobile devices enjoy the services provided by applications that stream video from servers to the battery-constrained devices. Viewing videos such as movies on mobile devices is a popular application. However, the communications used by the mobile devices to receive the video from the servers tends to drain the batteries.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 13 illustrates a method for lossy video encoding for battery-constrained devices, in accordance with some examples.

FIG. 14 illustrates a method for lossy video encoding for battery-constrained devices, in accordance with some examples.

DETAILED DESCRIPTION

Figure 1:
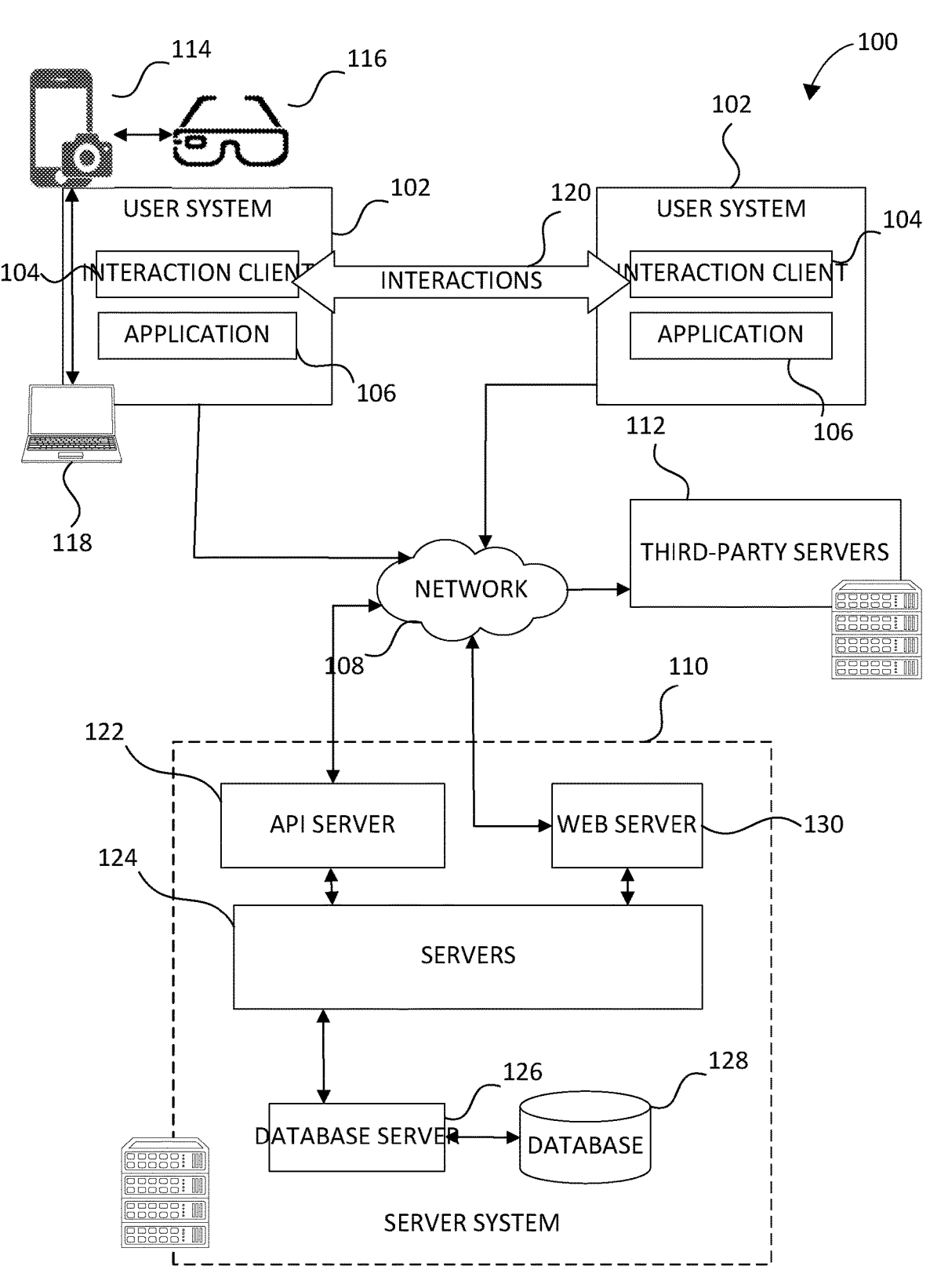
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Users of battery-constrained devices enjoy the services provided by applications that stream video from a server. For example, a movie playing application on an augmented reality (AR), extended reality (XR), or virtual reality (VR) head-wearable device ("XR head-wearable device") can provide entertainment to a user by making available many movies stored on a server.

A technical problem is how to provide streaming services from a server to the battery-constrained device while decreasing the amount of power used to provide the streaming services. In some examples, the technical problem is addressed by the battery-constrained device sending gaze positions of a user viewing the video to the server. The server uses the gaze positions to determine which portions of a frame of the video to compress with lower levels of lossy compression. The lower levels of lossy compression provide higher visual fidelity and are less lossy. The lower levels of lossy compression are used in the area of the frame where the user gazing.

Higher levels of lossy compression are used on other areas of the frames, which enable greater compression at the cost of a loss of visual fidelity to the original frame. Using different levels of lossy compression enable the server to compress the frames to be smaller, which reduces the power needed by the battery-constrained device to receive the frames from the server. The battery-constrained device needs to decompress the frames but the power to decompress the frames is less than the power saved in receiving the smaller compressed frames from the server because the wireless communication link tends to be energy intensive.

Additionally, the server may use additional information to increase the perceived quality of the frames. For example, the server may keep track of the gaze positions and determine a velocity of the gaze positions and compress the frames based on anticipated next locations of the gaze positions of the user when the user is viewing the frames. Moreover, the server, which, in some examples, is not power constrained, may perform object identification on the frames. The object identification may be used to extend the portions of the frames that are compressed with lower levels of lossy compression. For example, a face near a gaze position may be compressed using lower levels of lossy compression as the gaze position may quickly dart over to the nearby face.

Another technical problem is how to stream a video to a user of a battery-constrained device when the communication link is slower. The technical problem may be addressed in a similar way as the technical problem of reducing the energy used in streaming a video is addressed. The levels used in the lossy compression standard are selected to enable streaming the video using the slower communication link. The lower levels of lossy compression used on the areas of the video where the user is gazing may provide sufficient quality for the user to stream a video despite the slower communications link.

Networked Computing Environment

FIG. 1 is a block diagram showing an example digital interaction system 100 for facilitating interactions and engagements (e.g., exchanging text messages, conducting text audio and video calls, or playing games) over a network. The digital interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), a server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the server system 110 via the network 108. The data exchanged between the interaction clients 104 (e.g., interactions 120) and between the interaction clients 104 and the server system 110 includes functions (e.g., commands to invoke functions) and payload data (e.g., text, audio, video, or other multimedia data).

The server system 110 provides server-side functionality via the network 108 to the interaction clients 104. While certain functions of the digital interaction system 100 are described herein as being performed by either an interaction client 104 or by the server system 110, the location of certain functionality either within the interaction client 104 or the server system 110 may be a design choice. For example, it may be technically preferable to initially deploy particular technology and functionality within the server system 110 but to later migrate this technology and functionality to the interaction client 104 where a user system 102 has sufficient processing capacity.

The server system 110 supports various services and operations that are provided to the interaction clients 104. Such operations include transmitting data to, receiving data from, and processing data generated by the interaction clients 104. This data may include message content, client device information, geolocation information, digital effects (e.g., media augmentation and overlays), message content persistence conditions, entity relationship information, and live event information. Data exchanges within the digital interaction system 100 are invoked and controlled through functions available via user interfaces (UIs) of the interaction clients 104.

Turning now specifically to the server system 110, an Application Program Interface (API) server 122 is coupled to and provides programmatic interfaces to servers 124, making the functions of the servers 124 accessible to interaction clients 104, other applications 106 and third-party server 112. The servers 124 are communicatively coupled to a database server 126, facilitating access to a database 128 that stores data associated with interactions processed by the servers 124. Similarly, a web server 130 is coupled to the servers 124 and provides web-based interfaces to the servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the servers 124. The Application Program Interface (API) server 122 exposes various functions supported by the servers 124, including account registration; login functionality; the sending of interaction data, via the servers 124, from a particular interaction client 104 to another interaction client 104; the communication of media files (e.g., images or video) from an interaction client 104 to the servers 124; the settings of a collection of media data (e.g., a narrative); the retrieval of a list of friends of a user of a user system 102; the retrieval of messages and content; the addition and deletion of entities (e.g., friends) to an entity relationship graph (e.g., the entity graph 308); the location of friends within an entity relationship graph; and opening an application event (e.g., relating to the interaction client 104).

The servers 124 host multiple systems and subsystems, described below with reference to FIG. 2.

External Recources and Linked Applications

The interaction client 104 provides a user interface that allows users to access features and functions of an external resource, such as a linked application 106, an applet, or a microservice. This external resource may be provided by a third party or by the creator of the interaction client 104.

The external resource may be a full-scale application installed on the user's system 102, or a smaller, lightweight version of the application, such as an applet or a microservice, hosted either on the user's system or remotely, such as on third-party servers 112 or in the cloud. These smaller versions, which include a subset of the full application's features, may be implemented using a markup-language document and may also incorporate a scripting language and a style sheet.

When a user selects an option to launch or access the external resource, the interaction client 104 determines whether the resource is web-based or a locally installed application. Locally installed applications can be launched independently of the interaction client 104, while applets and microservices can be launched or accessed via the interaction client 104.

If the external resource is a locally installed application, the interaction client 104 instructs the user's system to launch the resource by executing locally stored code. If the resource is web-based, the interaction client 104 communicates with third-party servers to obtain a markup-language document corresponding to the selected resource, which it then processes to present the resource within its user interface.

The interaction client 104 can also notify users of activity in one or more external resources. For instance, it can provide notifications relating to the use of an external resource by one or more members of a user group. Users can be invited to join an active external resource or to launch a recently used but currently inactive resource.

The interaction client 104 can present a list of available external resources to a user, allowing them to launch or access a given resource. This list can be presented in a context-sensitive menu, with icons representing different applications, applets, or microservices varying based on how the menu is launched by the user.

System Architecture

Figure 2:
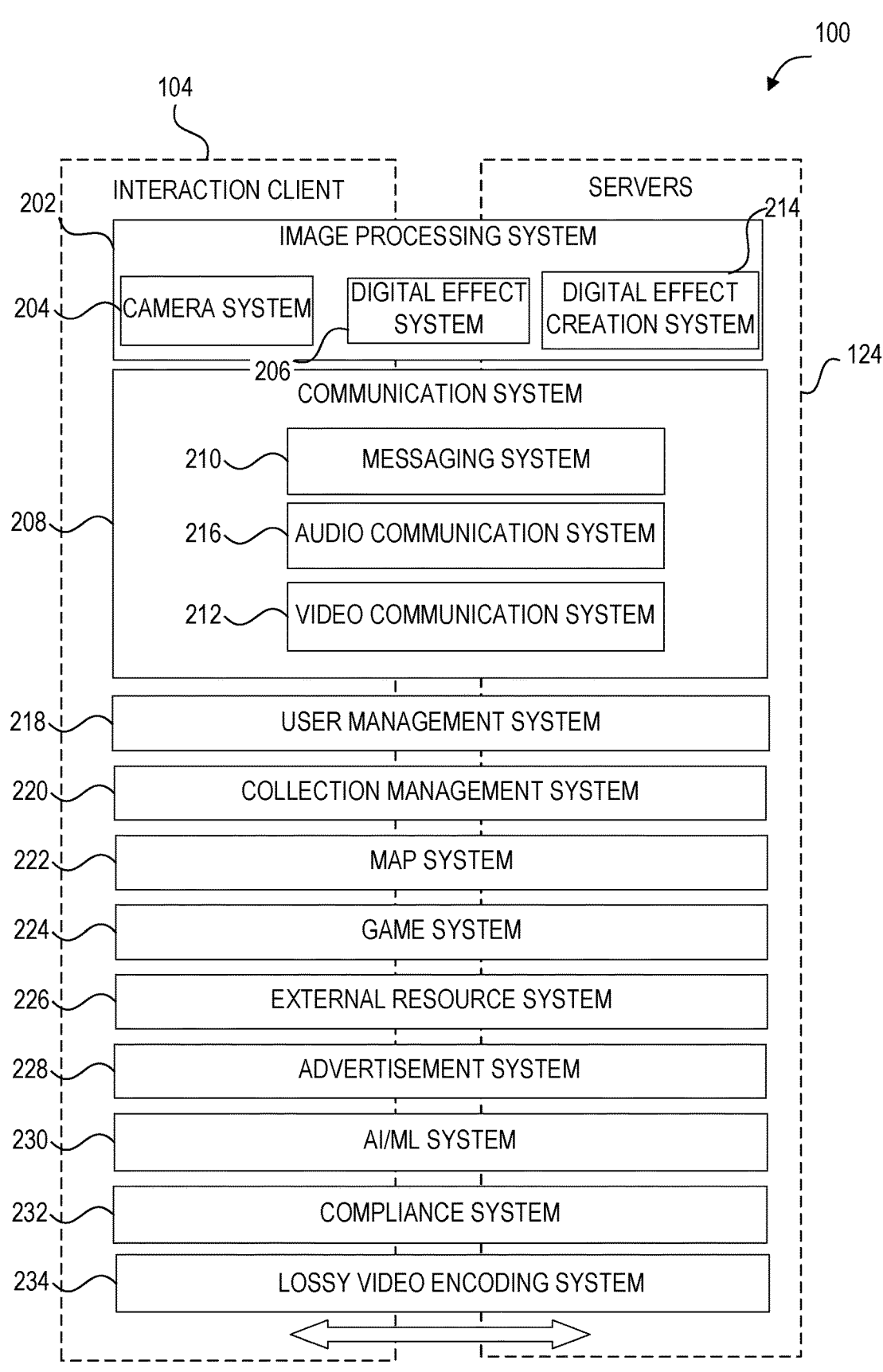
FIG. 2 is a diagrammatic representation of a digital interaction system that has both client-side and server-side functionality, according to some examples.

FIG. 2 is a block diagram illustrating further details regarding the digital interaction system 100, according to some examples. Specifically, the digital interaction system 100 is shown to comprise the interaction client 104 and the servers 124. The digital interaction system 100 embodies multiple subsystems, which are supported on the client-side by the interaction client 104 and on the server-side by the servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the digital interaction system 100.

Service discovery: Microservice subsystems may find and communicate with other microservice subsystems of the digital interaction system 100. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable the tracking of health and performance of a microservice subsystem.

In some examples, the digital interaction system 100 may employ a monolithic architecture, a service-oriented architecture (SOA), a function-as-a-service (FaaS) architecture, or a modular architecture:

The lossy video encoding system 234 provides various functions to encode or compress video or video frames using one or more lossy compression standard. In some examples, the lossy video encoding system 234 responds to requests to stream video from the mobile device 902 of FIG. 9. In some examples, the lossy video encoding system 234 responds to requests from the server device 1002 of FIG. 10 to provide modules or code to perform lossy compression standards in accordance with levels or parameters of the lossy compression standards.

An image processing system 202 provides various functions that enable a user to capture and modify (e.g., augment, annotate or otherwise edit) media content associated with a message.

A camera system 204 includes control software (e.g., in a camera application) that interacts with and controls hardware camera hardware (e.g., directly or via operating system controls) of the user system 102 to modify real-time images captured and displayed via the interaction client 104.

The digital effect system 206 provides functions related to the generation and publishing of digital effects (e.g., media overlays) for images captured in real-time by cameras of the user system 102 or retrieved from memory of the user system 102. For example, the digital effect system 206 operatively selects, presents, and displays digital effects (e.g., media overlays such as image filters or modifications) to the interaction client 104 for the modification of real-time images received via the camera system 204 or stored images retrieved from memory 502 of a user system 102. These digital effects are selected by the digital effect system 206 and presented to a user of an interaction client 104, based on a number of inputs and data, such as for example:

Geolocation of the user system 102; and

Entity relationship information of the user of the user system 102.

Digital effects may include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The digital effect creation system 214 supports augmented reality developer platforms and includes an application for content creators (e.g., artists and developers) to create and publish digital effects (e.g., augmented reality experiences) of the interaction client 104. The digital effect creation system 214 provides a library of built-in features and tools to content creators including, for example custom shaders, tracking technology, and templates.

In some examples, the digital effect creation system 214 provides a merchant-based publication platform that enables merchants to select a particular digital effect associated with a geolocation via a bidding process. For example, the digital effect creation system 214 associates a media overlay of the highest bidding merchant with a corresponding geolocation for a predefined amount of time.

A communication system 208 is responsible for enabling and processing multiple forms of communication and interaction within the digital interaction system 100 and includes a messaging system 210, an audio communication system 216, and a video communication system 212. The messaging system 210 is responsible, in some examples, for enforcing the temporary or time-limited access to content by the interaction clients 104. The messaging system 210 incorporates multiple timers that, based on duration and display parameters associated with a message or collection of messages (e.g., a narrative), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 306, entity graphs 308 and profile data 302) regarding users and relationships between users of the digital interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event collection." Such a collection may be made available for a specified time period, such as the duration of an event to which the content relates. For example, content relating to a music concert may be made available as a "concert collection" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the digital interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the digital interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the digital interaction system 100. The digital interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the servers 124. The SDK includes Application Programming Interfaces (APIs) with functions that can be called or invoked by the web-based application. The servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to servers 124. The servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and handles the delivery and presentation of these advertisements.

An artificial intelligence and machine learning system 230 provides a variety of services to different subsystems within the digital interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the digital effect system 206 to generate modified content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the server system 110. The artificial intelligence and machine learning system 230 may also work with the audio communication system 216 to provide speech recognition and natural language processing capabilities, allowing users to interact with the digital interaction system 100 using voice commands.

A compliance system 232 facilitates compliance by the digital interaction system 100 with data privacy and other regulations, including for example the California Consumer Privacy Act (CCPA), General Data Protection Regulation (GDPR), and Digital Services Act (DSA). The compliance system 232 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 232 also incorporates opt-in/opt-out management and privacy controls across the digital interaction system 100, empowering users to manage their data preferences. The compliance system 232 is designed to handle sensitive data by obtaining explicit consent, implementing strict access controls and in accordance with applicable laws.

Data Architecture

Figure 3:
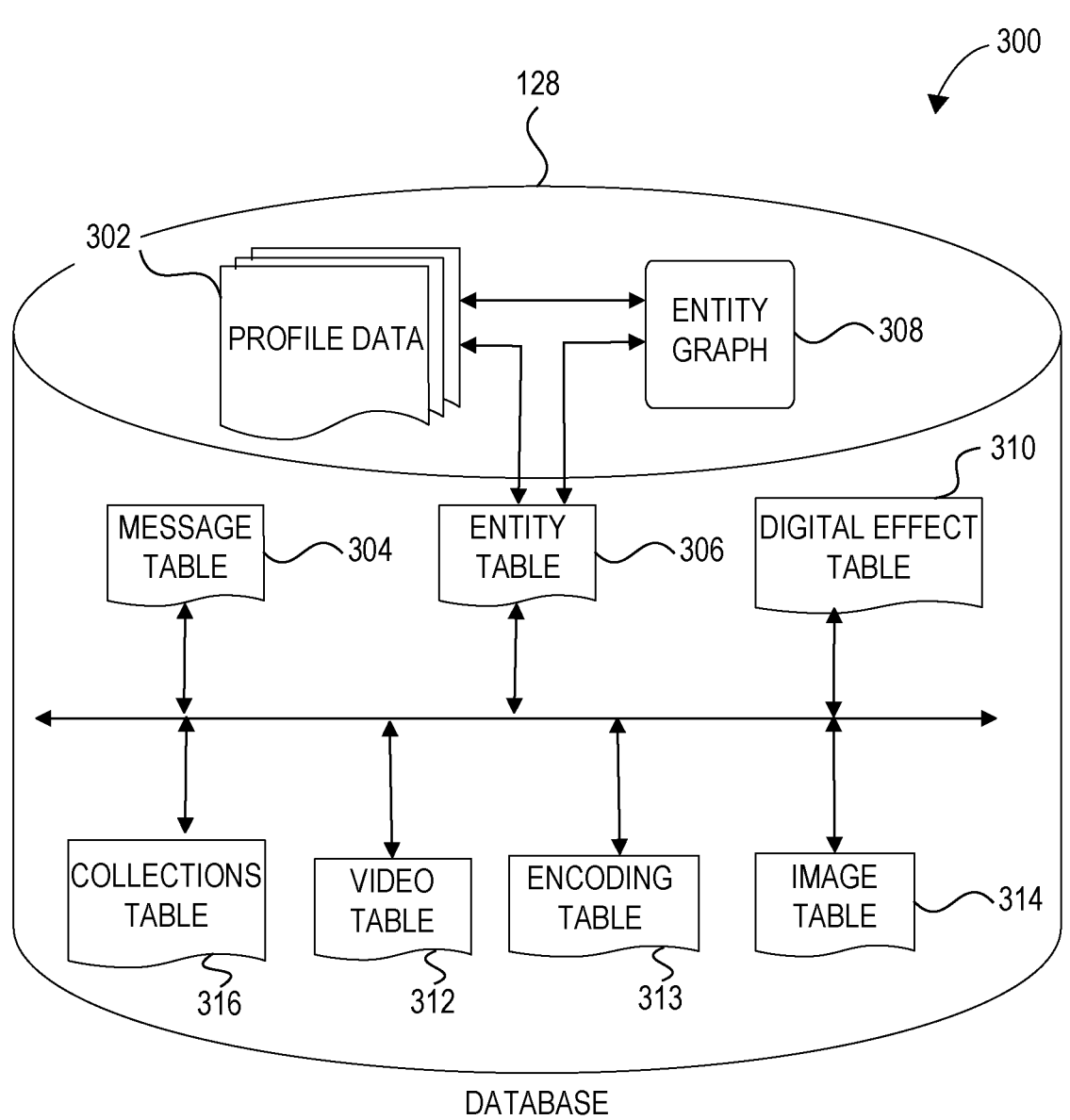
FIG. 3 is a diagrammatic representation of a data structure as maintained in a database, according to some examples.

FIG. 3 is a schematic diagram illustrating data structures 300, which may be stored in the database 128 of the server system 110, according to certain examples. While the content of the database 128 is shown to comprise multiple tables, it will be appreciated that the data could be stored in other types of data structures (e.g., as an object-oriented database).

The database 128 includes message data stored within a message table 304. This message data includes at least message sender data, message recipient (or receiver) data, and a payload. Further details regarding information that may be included in a message, and included within the message data stored in the message table 304, are described below with reference to FIG. 3.

An entity table 306 stores entity data, and is linked (e.g., referentially) to an entity graph 308 and profile data 302. Entities for which records are maintained within the entity table 306 may include individuals, corporate entities, organizations, objects, places, events, and so forth. Regardless of entity type, any entity regarding which the server system 110 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the digital interaction system 100.

Certain permissions and relationships may be attached to each relationship, and to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the digital interaction system 100, or may selectively be applied to certain types of relationships.

The profile data 302 stores multiple types of profile data about a particular entity. The profile data 302 may be selectively used and presented to other users of the digital interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the digital interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 128 also stores digital effect data, such as overlays or filters, in a digital effect table 310. The digital effect data is associated with and applied to videos (for which data is stored in a video table 312) and images (for which data is stored in an image table 314).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other digital effect data that may be stored within the image table 314 includes augmented reality content items (e.g., corresponding to augmented reality experiences). An augmented reality content item may be a real-time special effect and sound that may be added to an image or a video.

A collections table 316 stores data regarding collections of messages and associated image, video, or audio data, which are compiled into a collection (e.g., a narrative or a gallery). The creation of a particular collection may be initiated by a particular user (e.g., each user for which a record is maintained in the entity table 306). A user may create a "personal collection" in the form of a collection of content that has been created and sent/broadcast by that user. To this end, the user interface of the interaction client 104 may include an icon that is user-selectable to enable a sending user to add specific content to his or her personal narrative.

A collection may also constitute a "live collection," which is a collection of content from multiple users that is created manually, automatically, or using a combination of manual and automatic techniques. For example, a "live collection" may constitute a curated stream of user-submitted content from various locations and events. Users whose client devices have location services enabled and are at a common location event at a particular time may, for example, be presented with an option, via a user interface of the interaction client 104, to contribute content to a particular live collection. The live collection may be identified to the user by the interaction client 104, based on his or her location.

A further type of content collection is known as a "location collection," which enables a user whose user system 102 is located within a specific geographic location (e.g., on a college or university campus) to contribute to a particular collection. In some examples, a contribution to a location collection may employ a second degree of authentication to verify that the end-user belongs to a specific organization or other entity (e.g., is a student on the university campus).

As mentioned above, the video table 312 stores video data that, in some examples, is associated with messages for which records are maintained within the message table 304. Similarly, the image table 314 stores image data associated with messages for which message data is stored in the entity table 306. The entity table 306 may associate various digital effects from the digital effect table 310 with various images and videos stored in the image table 314 and the video table 312.

The databases 128 also includes an encoding table 313, which includes support information for systems 900, 1000 for lossy video encoding for battery-constrained devices. The encoding table 313 includes data associated with, referring to FIGS. 9 and 10, the encoding information 909, 1003, video frames 1014, which may have associated gaze positions 1020, and so forth. The data stored in the encoding table 313 may be requested by the mobile device 902 or the server device 1002 in assisting the server device 1002 in encoding or compressing the video frames 1014 and by the mobile device 902 in decoding or decompressing the video frames 910.

Data Communications Architecture

Figure 4:
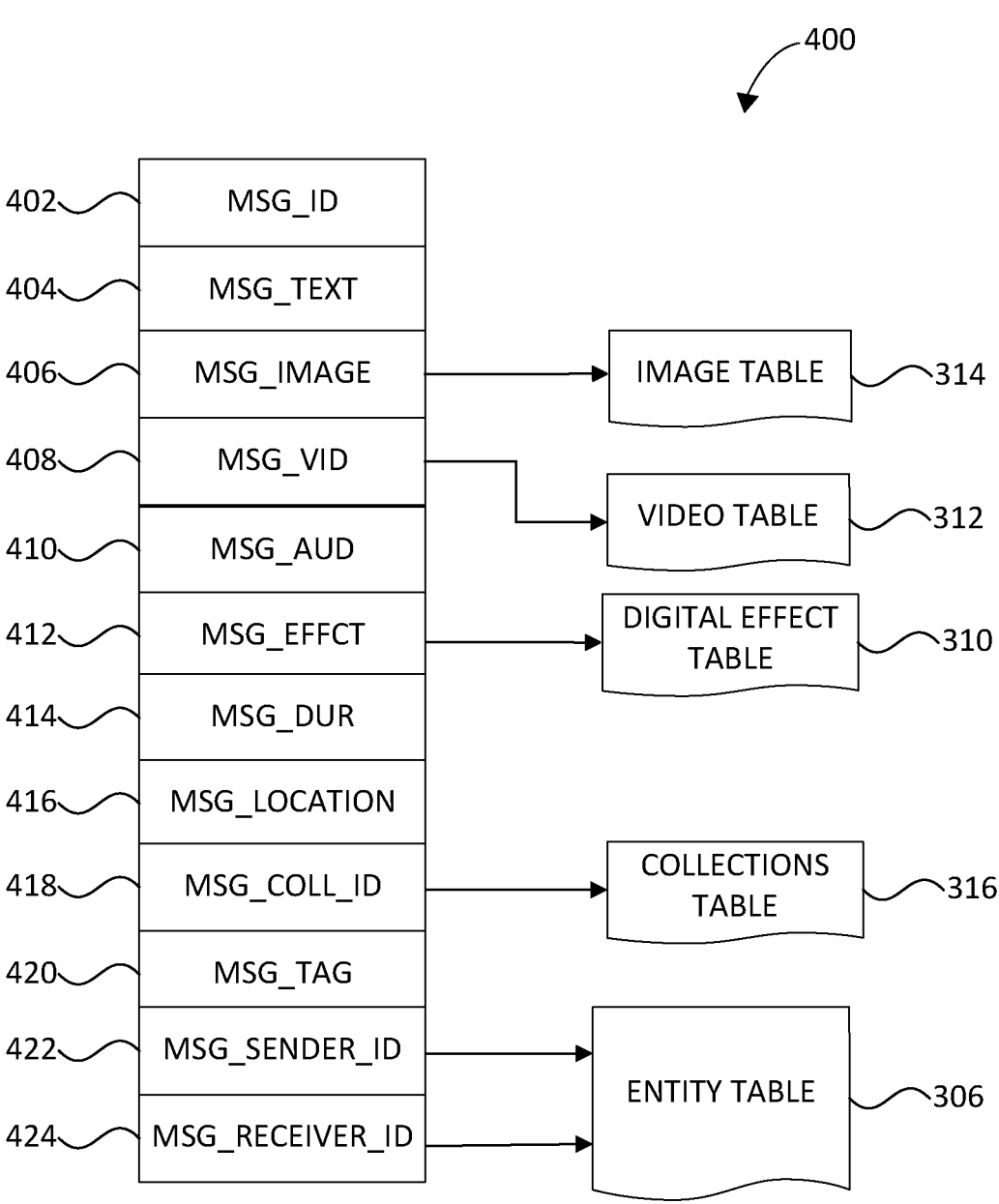
FIG. 4 is a diagrammatic representation of a message, according to some examples.

FIG. 4 is a schematic diagram illustrating a structure of a message 400, according to some examples, generated by an interaction client 104 for communication to a further interaction client 104 via the servers 124. The content of a particular message 400 is used to populate the message table 304 stored within the database 128, accessible by the servers 124. Similarly, the content of a message 400 is stored in memory as "in-transit" or "in-flight" data of the user system 102 or the servers 124. A message 400 is shown to include the following example components:

Message identifier (MSG_ID 402): a unique identifier that identifies the message 400.

Message text (MSG_TXT 404) payload: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 314.

Message video payload 408: video data, captured by a camera component or retrieved from a memory component of the user system 102, and that is included in the message 400. Video data for a sent or received message 400 may be stored in the video table 312.

Message audio payload 410: audio data, captured by a microphone or retrieved from a memory component of the user system 102, and that is included in the message 400.

Message digital effect data 412: digital effect data (e.g., filters, stickers, or other annotations or enhancements) that represents digital effects to be applied to message image payload 406, message video payload 408, or message audio payload 410 of the message 400. Digital effect data for a sent or received message 400 may be stored in the digital effect table 310.

Message duration parameter (MSG_DUR 414): parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message collection identifier 418: identifier values identifying one or more content collections (e.g., "stories"

identified in the collections table 316) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 314. Similarly, values within the message video payload 408 may point to data stored within a video table 314, values stored within the message digital effect data 412 may point to data stored in a digital effect table 310, values stored within the message collection identifier 418 may point to data stored in a collections table 316, and values stored within the message sender identifier 422 and the message receiver identifier 424 may point to user records stored within an entity table 306.

System with Head-Wearable Apparatus

Figure 5:
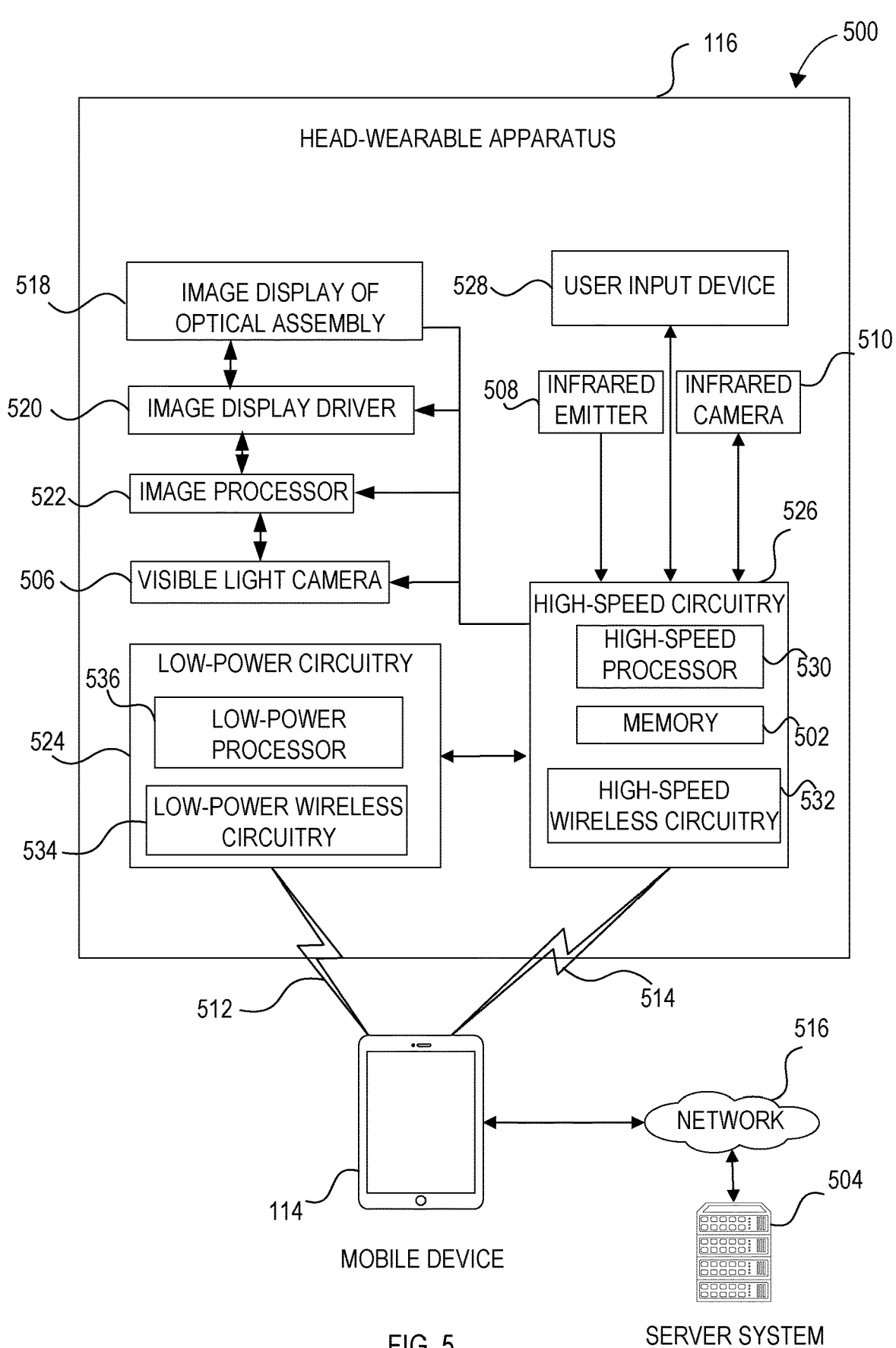
FIG. 5 illustrates a system in which the head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the server system 110) via various networks 108.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset, or all the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WI-FIR. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (e.g., Bluetooth™, Bluetooth LE, Zigbee, ANT+) and wireless wide, local, or wide area network transceivers (e.g., cellular or WI-FI®). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532.

Machine Architecture

Figure 6:
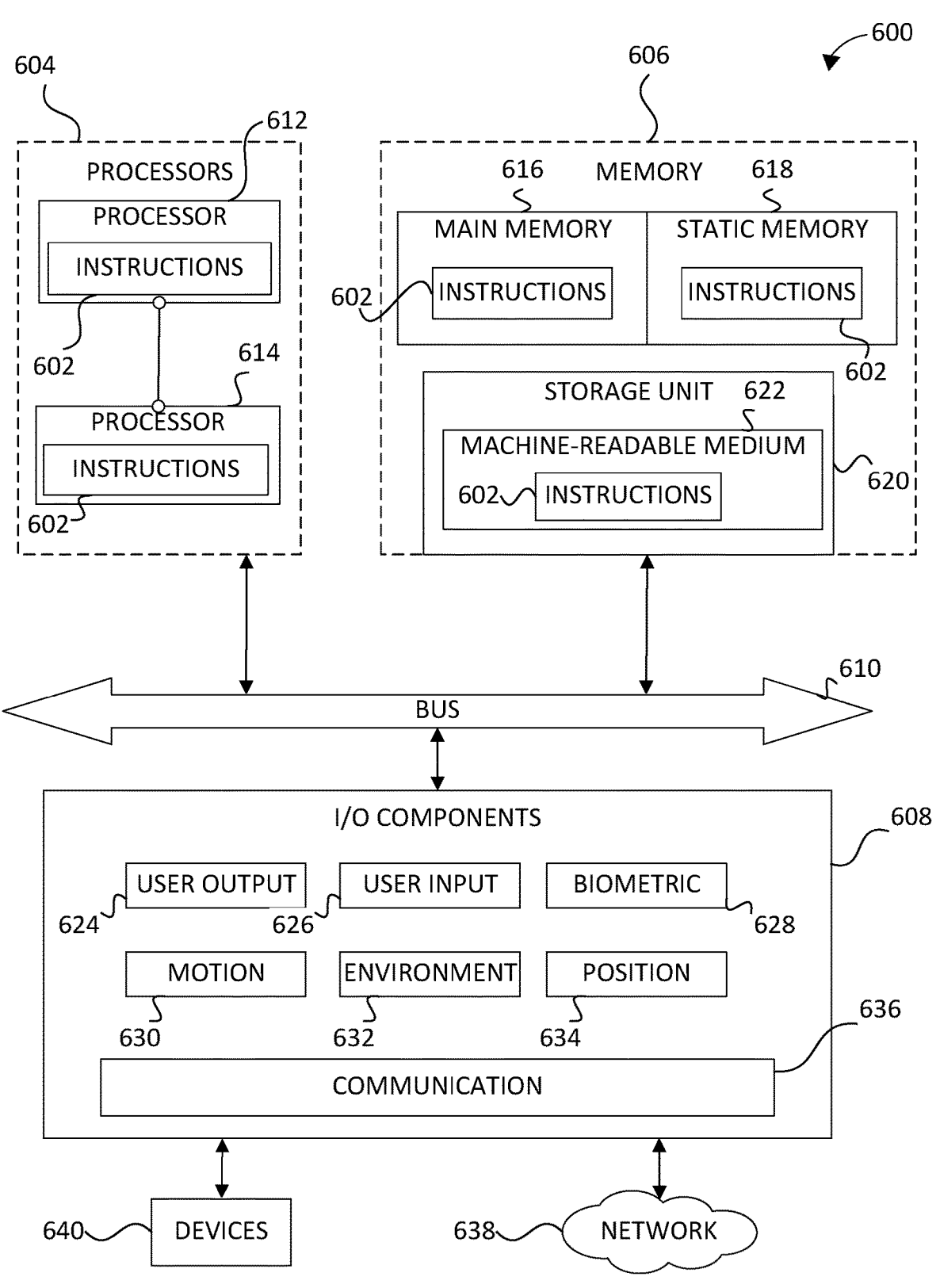
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the server system 110. In some examples, the machine 600 may also comprise both client and server systems, with certain operations of a particular method or algorithm being performed on the server-side and with certain operations of the method or algorithm being performed on the client-side.

The machine 600 may include processors 604, 612, 614, memory 606, and input/output I/O components 608, which may be configured to communicate with each other via a bus 610.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In some examples, the head-wearable apparatus 116 may include biometric 628 components or sensors to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request, and in accordance with applicable laws. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information. The position 634 component may determine a position of the machine 600. Methods and apparatuses are described herein that determine position 634.

The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
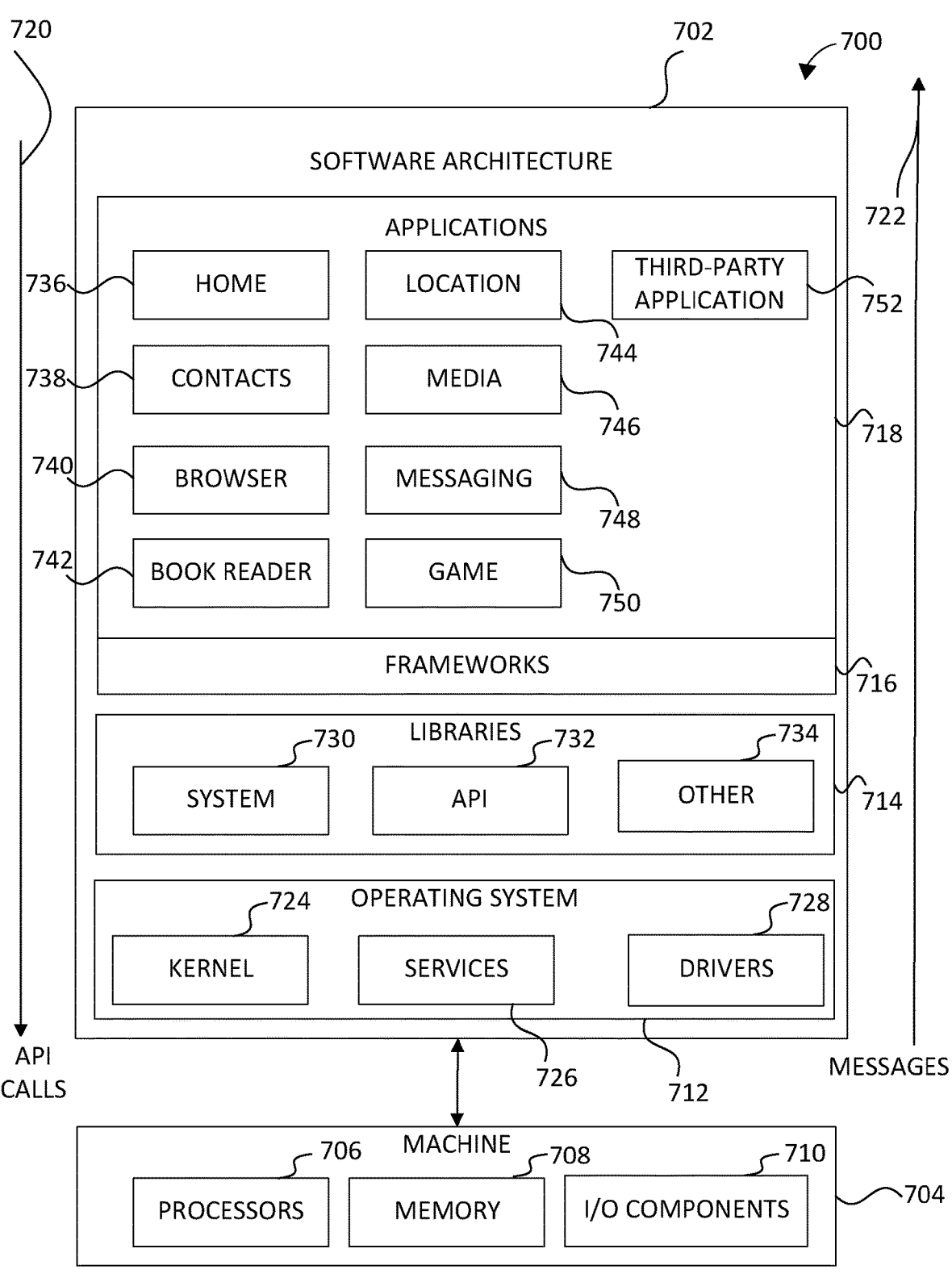
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematical functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application tion 752 can invoke the API calls 720 provided by the operating system 712 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Figure 8:
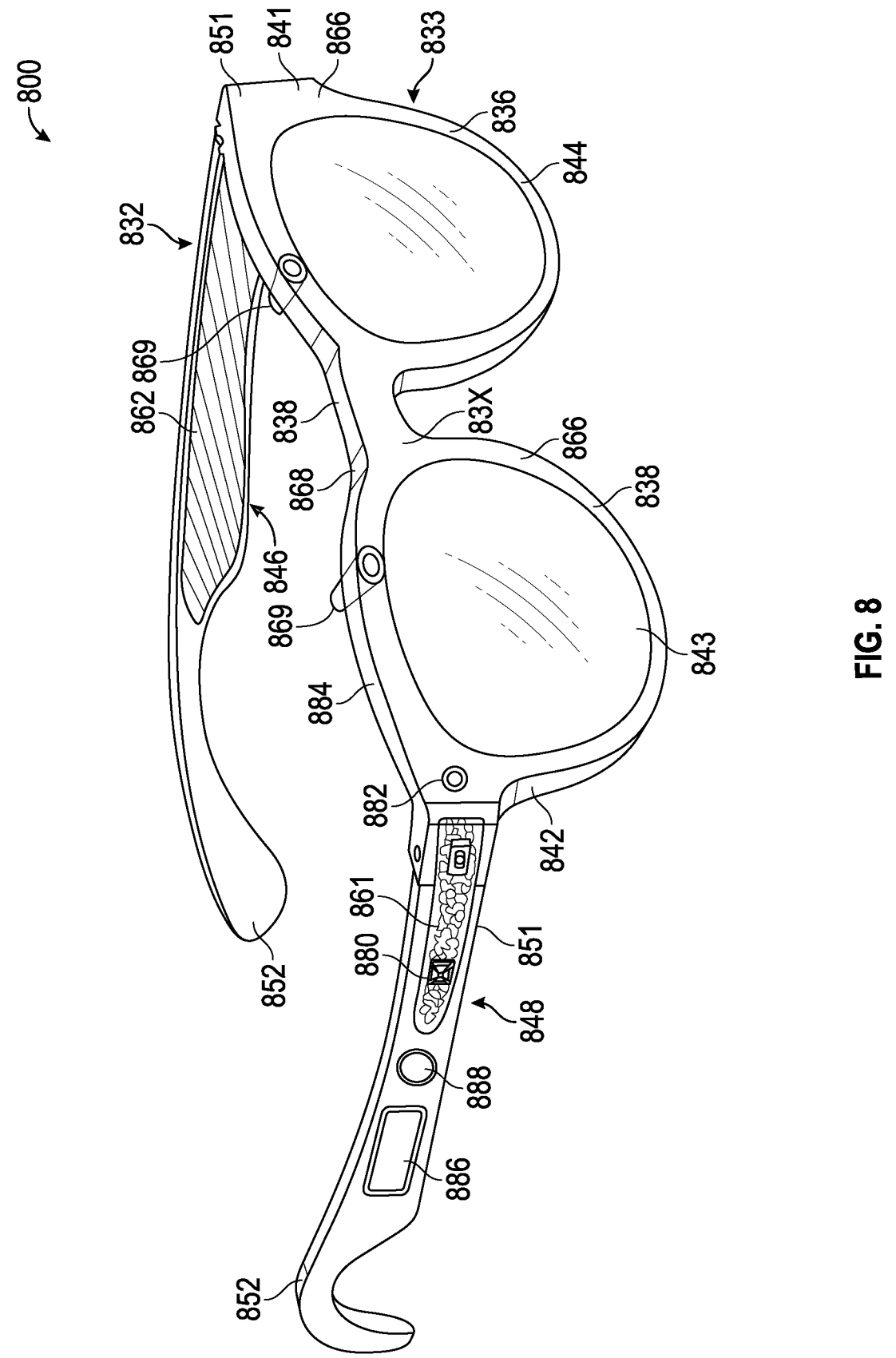
FIG. 8 is a perspective view of a head-wearable apparatus in the form of glasses, in accordance with some examples.

FIG. 8 is a perspective view of a head-wearable apparatus in the form of glasses 800, in accordance with some examples. The glasses 800 are an article of eyewear including electronics, which operate within a network system for communicating image and video content. FIG. 8 illustrates an example of the head-wearable apparatus 116. In some examples, the wearable electronic device is termed augmented reality (AR), mixed reality (MR), virtual reality (VR), and/or extended reality (XR) glasses. The glasses 800 can include a frame 832 made from any suitable material such as plastic or metal, including any suitable shape memory alloy. The frame 832 can have a front piece 833 that can include a first or left lens, display, or optical element holder 836 and a second or right lens, display, or optical element holder 837 connected by a bridge 838. The front piece 833 additionally includes a left end portion 841 and a right end portion 842. A first or left optical element 844 and a second or right optical element 843 can be provided within respective left and right optical element holders 836, 837. Each of the optical elements 843, 844 can be a lens, a display, a display assembly, or a combination of the foregoing. In some examples, for example, the glasses 800 are provided with an integrated near-eye display mechanism that enables, for example, display to the user of preview images for visual media captured by cameras 869 of the glasses 800.

The frame 832 additionally includes a left arm or temple piece 846 and a right arm or temple piece 847 coupled to the respective left and right end portions 841, 842 of the front piece 833 by any suitable means such as a hinge (not shown), so as to be coupled to the front piece 833, or rigidly or fixedly secured to the front piece 833 so as to be integral with the front piece 833. Each of the temple pieces 846 and 847 can include a first portion 851 that is coupled to the respective end portion 841 or 842 of the front piece 833 and any suitable second portion 852, such as a curved or arcuate piece, for coupling to the car of the user. In one example, the front piece 833 can be formed from a single piece of material, so as to have a unitary or integral construction. In one example, the entire frame 832 can be formed from a single piece of material so as to have a unitary or integral construction.

The glasses 800 include a computing device, such as a computer 861, which can be of any suitable type so as to be carried by the frame 832 and, in one example, of a suitable size and shape, so as to be at least partially disposed in one or more of the temple pieces 846 and 847. In one example, the computer 861 has a size and shape similar to the size and shape of one of the temple pieces 846, 847 and is thus disposed almost entirely if not entirely within the structure and confines of such temple pieces 846 and 847.

In one example, the computer 861 can be disposed in both of the temple pieces 846, 847. The computer 861 can include one or more processors with memory, wireless communication circuitry, and a power source. The computer 861 comprises low-power circuitry, high-speed circuitry, location circuitry, and a display processor. Various other examples may include these elements in different configurations or integrated together in different ways. Additional details of aspects of the computer 861 may be implemented as described with reference to the description that follows.

The computer 861 additionally includes a battery 862 or other suitable portable power supply. In one example, the battery 862 is disposed in one of the temple pieces 846 or 847. In the glasses 800 shown in FIG. 8, the battery 862 is shown as being disposed in the left temple piece 846 and electrically coupled using a connection 874 to the remainder of the computer 861 disposed in the right temple piece 847. One or more input and output devices can include a connector or port (not shown) suitable for charging a battery 862 accessible from the outside of the frame 832, a wireless receiver, transmitter, or transceiver (not shown), or a combination of such devices.

The glasses 800 include digital cameras 869. Although two cameras 869 are depicted, other examples contemplate the use of a single or additional (i.e., more than two) cameras 869. For case of description, various features relating to the cameras 869 will be described further with reference to only a single camera 869, but it will be appreciated that these features can apply, in suitable examples, to both cameras

869. For example, the cameras 869 may include back facing cameras to capture the eyes of the user of the glasses 800.

In various examples, the glasses 800 may include any number of input sensors or peripheral devices in addition to the cameras 869. The front piece 833 is provided with an outward-facing, forward-facing, front, or outer surface 866 that faces forward or away from the user when the glasses 800 are mounted on the face of the user, and an opposite inward-facing, rearward-facing, rear, or inner surface 867 that faces the face of the user when the glasses 800 are mounted on the face of the user. Such sensors can include inward-facing video sensors or digital imaging components such as cameras 869 that can be mounted on or provided within the inner surface 867 of the front piece 833 or elsewhere on the frame 832 so as to be facing the user, and outward-facing video sensors or digital imaging components such as the cameras 869 that can be mounted on or provided with the outer surface 866 of the front piece 833 or elsewhere on the frame 832 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 843, 844 (or lenses) to provide a mixed reality or augmented reality experience for the user of the glasses 800.

The glasses 800 further include an example of a camera control mechanism or user input mechanism comprising a camera control button mounted on the frame 832 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 832 adjacent to its surface for detecting the presence of a user's finger, to dispose the touch-sensitive button to the engaged condition when the user touches a finger to the corresponding spot on the outer surface 866 of the frame 832. It will be appreciated that the above-described camera control button and capacitive touch button are but two examples of a haptic input mechanism for single-action control of the camera 869, and that other examples may employ different single-action haptic control arrangements.

The computer 861 is configured to perform the methods described herein. In some examples, the computer 861 is coupled to one or more antennas for reception of signals from a GNSS and circuitry for processing the signals where the antennas and circuitry are housed in the glasses 800. In some examples, the computer 861 is coupled to one or more wireless antennas and circuitry for transmitting and receiving wireless signals where the antennas and circuitry are housed in the glasses 800. In some examples, there are multiple sets of antennas and circuitry housed in the glasses 800. In some examples, the antennas and circuitry are configured to operate in accordance with a communication protocol such as Bluetooth™, Low-energy Bluetooth™, IEEE 802, IEEE 802.11az/be, WiFI®, and so forth. In some examples, PDR sensors housed in glasses 800 and coupled to the computer 861. In some examples, the glasses 800 are VR headsets where optical elements 843, 844 are opaque screens for displaying images to a user of the VR headset. In some examples, the computer 861 is coupled to user interface elements such as slide or touchpad 876 and button 878. A long press of button 878 resets the glasses 800. The slide or touchpad 876 and button 878 are used for a user to provide input to the computer 861 and/or other electronic components of the glasses 800. The glasses 800 include one or more microphones 882 that are coupled to the computer 861. The glasses 800 include one or more gyroscopes 880.

Lossy Video Encoding for Battery-Constrained Devices

Figure 9:
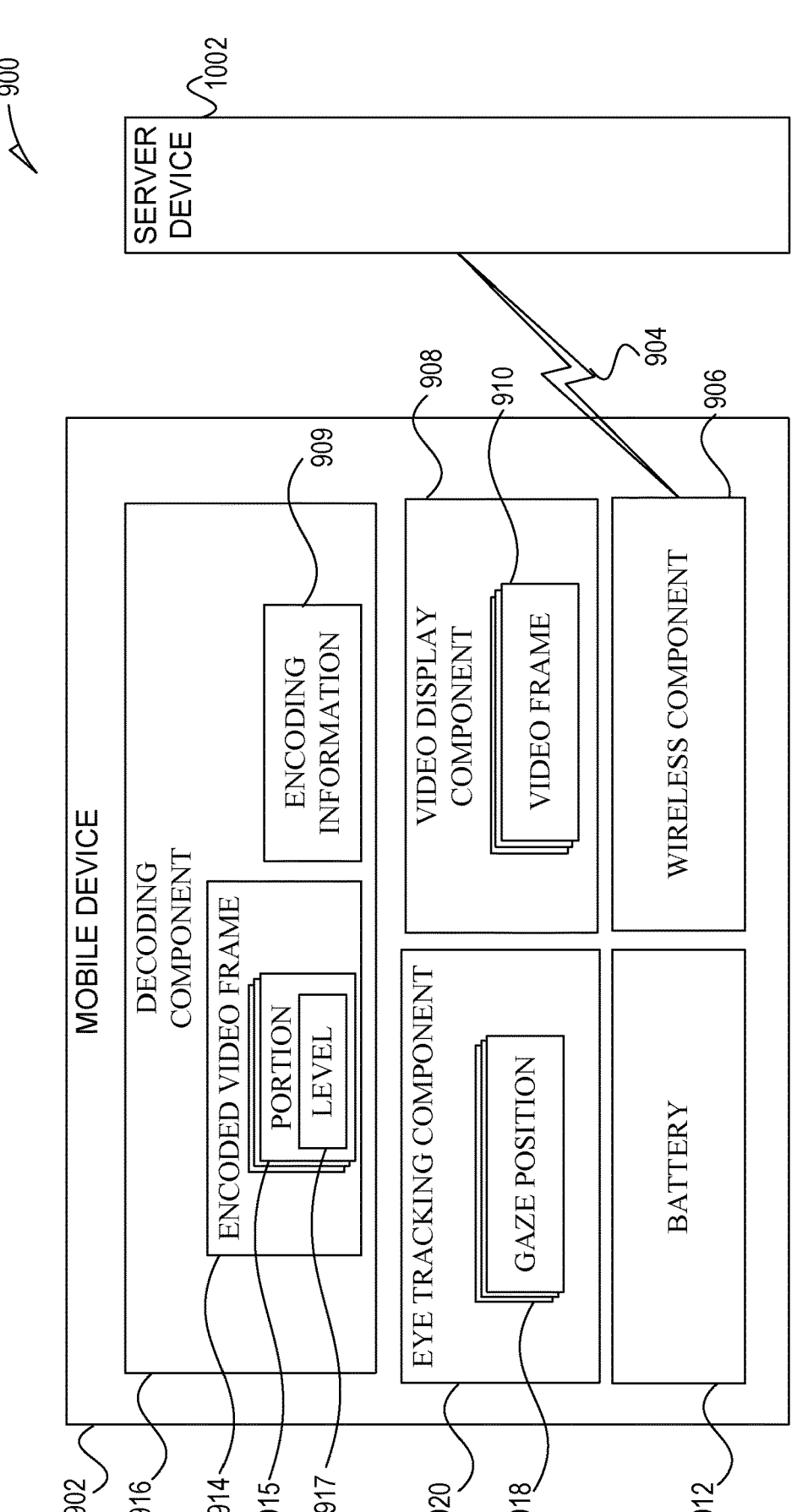
FIG. 9 illustrates a system for lossy video encoding for battery-constrained devices, in accordance with some examples.
Figure 10:
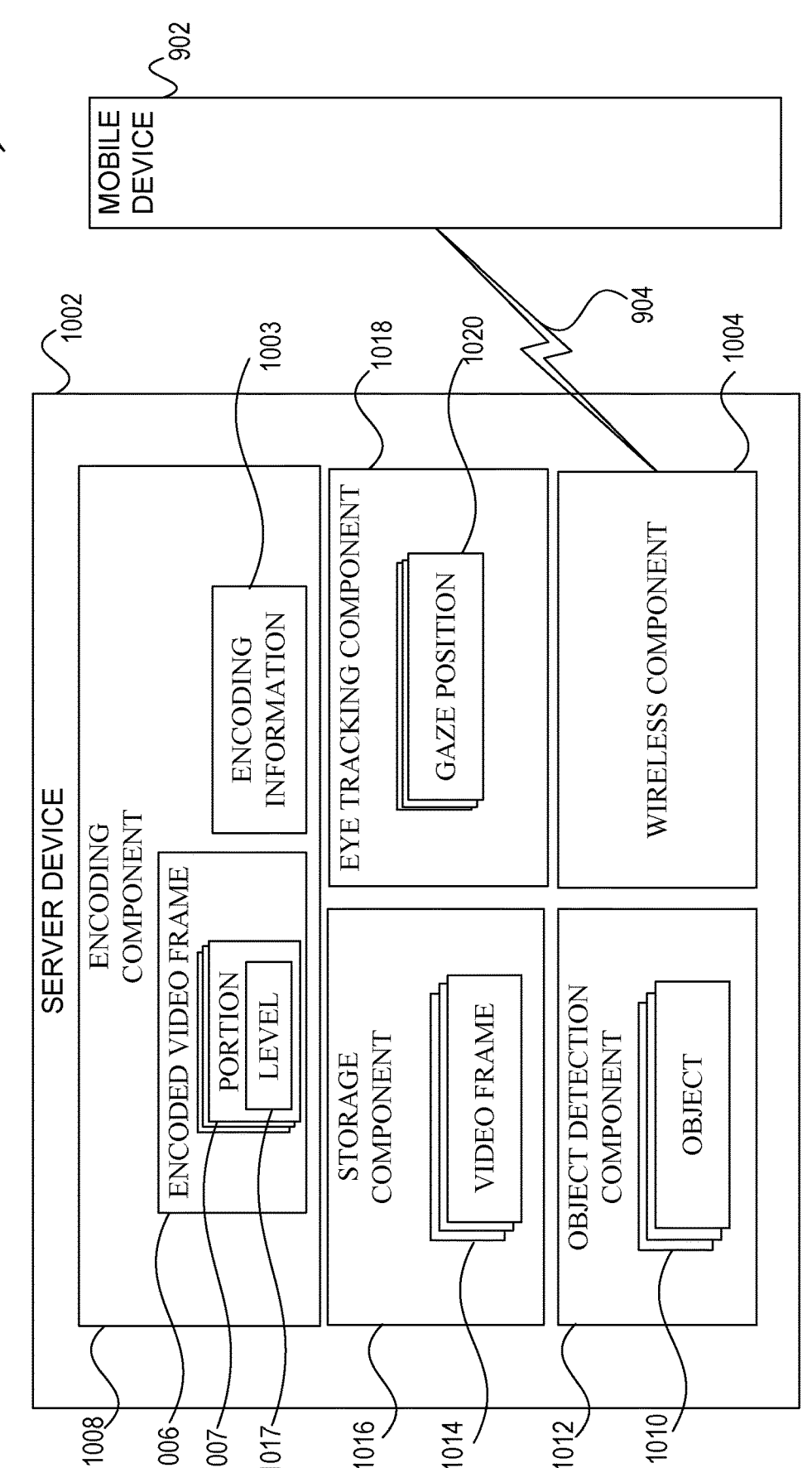
FIG. 10 illustrates a system for lossy video encoding for battery-constrained devices, in accordance with some examples.

FIG. 9 illustrates a system 900 for lossy video encoding for battery-constrained devices, in accordance with some examples. FIG. 10 illustrates a system 1000 for lossy video encoding for battery-constrained devices, in accordance with some examples. The mobile device 902 is a user system 102 of FIG. 1, in accordance with some examples. The mobile device 902 is a head-wearable apparatus 116 of FIG. 5, which may be the glasses 800 of FIG. 8, in accordance with some examples. The server device 1002 is a server system 110 of FIG. 1, in accordance with some examples. The server device 1002 is a server system 504 of FIG. 5, in accordance with some examples. The server device 1002 may be the mobile device 114 of FIG. 5, in accordance with some examples.

The mobile device 902 and server device 1002 communicate via wireless communications 904. The wireless components 906, 1004 includes one or more additional wireless receivers such as antennas. The wireless components 906, 1004 are configured to communicate with one another. The wireless communications 904 can be a slow speed communication protocol such as Bluetooth®, Bluetooth® Low Energy, or a higher-speed communication protocol such as IEEE 802.11, 3GPP, 5G, WiFi, cellular network modem, or another communications protocol. The wireless communications 904 can be a communication protocol that operates in the 2.4 GHz frequency band, or another frequency band. The wireless components 906, 1004 may be or include the low-power circuitry 524 and/or the high-speed circuitry 526 discussed in conjunction with FIG. 5.

The battery 912 provides power to the mobile device 902. The battery 912 provides a current charge state in accordance with some examples. The eye tracking component 920 determines the gaze position 918 of a user of the mobile device 902 when the user is viewing a video. The eye tracking component 920 comprises hardware that enables the eye tracking component 920 to determine the gaze position 918, which is a portion of the video frame 910 the user is looking or gazing at. The gaze position 918 may be an x and y coordinate indicating a position within the video frame 910. The hardware used by the eye tracking component 920 is back facing cameras 869 of FIG. 8 that enable the mobile device 902 to capture images of the eyes of the user, in accordance with some examples. The eye tracking component 920 identifies the eyes of the user within the captured images and determines the gaze position 918 based on a location of a screen of the mobile device 902 displaying a video frame 910. For example, the screen may be the optical elements 843, 844 where projectors are used to project images on the inner surface of the optical elements 843, 844 (or lenses) to provide a mixed reality or augmented reality experience for the user of the glasses 800, which may be the presentation of video frames 910 that comprise a movie, a video, a content clip, and so forth.

The eye tracking component 920 associates the gaze position 918 with one or more video frames 910. The video display component 908 plays the video frames 910 at a rate such as 10 to 100 video frames 910 a second for the user to view. The wireless component 906 sends the gaze position 918 to the server device 1002. The wireless component 906 receives the encoded video frames 914 from the server device 1002.

The decoding component 916 decodes the encoded video frame 914 to generate the video frames 910. The terms decoding and decompressing may be used interchangeably, in accordance with some examples. The decoding component 916 uses the encoding information 909, 1003, which may include a lossy compression standard used, parameters used for the lossy compression standard, and indications of the different portions 915 of the encoded video frame 914. The decoding component 916 is configured to decode the encoded video frames 914 in accordance with the lossy compression standard indicated by the encoding information 909.

In accordance with some embodiments, the lossy compression standard is at least one of: an Advanced Video Coding (AVC) lossy compression standard, an H.264 lossy compression standard, a Moving Picture Experts Group (MPEG) lossy compression standard, a Huffman Coding lossy compression standard, a Run-Length Encoding (RLE) lossy compression standard, a Lempel-Ziv-Welch (LZW) lossy compression standard, a Dictionary Coding lossy compression standard, a lossy compression standard based on the discrete cosine transform (DCT), or a proprietary lossy compression standard. The lossy compression standards have parameters or levels, which compress the video frame 910 differently. The parameters or levels indicate how lossy the lossy compression standard will be and how much compression the video frame 910 will be achieved. The level 917 of the portion 915 of the encoded video frame 914 indicates parameters or which level was used to encode or compress the portion 915 of the encoded video frame 914. The levels 917 ensure that encoded video frames 910 meet specific requirements for resolution, bitrate, and frame rate. As used in this disclosure, a lower-level number indicates less lossy parameters used for the lossy compression standard. A lower level 917 number then indicates that the portion 915 is not as compressed as it could be but will have a higher fidelity to the original video frame. Different lossy compression standards may be used for the different portions 915 or different levels 917 may be used using the same lossy compression standard.

Lossy compression standards have a high compression ratio which allows for high-quality video frames 910 to be delivered at lower bitrates to the mobile device 902. The lower levels 917 may be used for portions 915 near the gaze position 918 and higher levels may be used for portions 915 away from the gaze position 918. Additionally, the level 917 and/or lossy compression standard may be adjusted to accommodate the bitrate of the communications 904. The use of a lower levels 917, which results in higher quality video, near the gaze position 918 may enable the playing of video frames 910 at a suitable quality even when the communications 904 rate is very slow such as with a lower energy communication standard.

In some examples, one or more portions 915 of the encoded video frame 914 may be compressed with a lossless compression standard and one or more other portions 915 of the encoded video frame 914 may be compressed with a lossy compression standard.

In some examples, the mobile device 902 records video frames 910 such as at a sports or music event and records the gaze position 918 of the user for the video frames 910. The video frames 910 can then be uploaded to the server device 1002 and streamed to a mobile device 902 where the compression performed on the video frames 910 is based on recorded gaze positions 918. In some examples, the encoding component 1008 uses the gaze positions 918 associated with the video frames 910 and actual gaze positions 1020 received by the mobile device 902 during streaming to determine which areas of the video frames 1014 to encode with more detail, which means less lossy or with a lower level 1017, and which portions of the video frames 1014 to encode with less detail, which means more lossy or with a higher level 1017.

In some examples, the communications 904 consume more energy than the decoding component 916 does, so by compressing the video frames 910, the mobile device 902 conserves energy usage to lessen the drain on the battery 912. For example, if the video frames 910 were sent by the server device 1002 to the mobile device 902 without compression, then the mobile device 902 would consume more energy in receiving the uncompressed video frames 910, then the mobile device 902 would consume in receiving the encoded video frames 914 and then using the decoding component 916 to decode or decompress the encoded video frame 914 to generate the video frame 910. In some examples, the decoding component 916 is implemented suing hardware to reduce the energy consumed in decoding or decompressing the video frames 910.

The term encoding and decoding may be used rather than compressing and decompressing as, in some embodiments, additional processing may be performed on the video frame 1014 such as error detection and correction codes may be added as well as other information such as sequence information.

The storage component 1016 accesses video frames 1014 to stream to the mobile device 902. The video frames 1014 may be stored in the encoding table 313 of FIG. 3, locally, or in another location. The mobile device 902 sends an indication to the server device 1002 of a sequence of video frames 1014 to stream to the mobile device 902. The storage component 1016 accesses the video frames 1014 and makes them accessible to the other modules of the server device 1002.

The eye tracking component 1018 associates received gaze positions 1020 with video frames 1014 that were previously transmitted to the mobile device 902. The mobile device 902 sends a gaze position 918 with an indication of which video frame 910 the gaze position 1020 is applicable to. The eye tracking component 1018 determines an anticipated gaze position 1020 for a video frame 1014 to be transmitted to the mobile device 902 based on previous gaze positions 1020 and, optionally, based on objects 1010 within the video frame 1014. For example, if the gaze position 1020 is moving rapidly to the right in a sequence of video frames 1014, then the gaze position 1020 may be adjusted in accordance with a velocity of the gaze position 1020.

Additionally, the gaze position 1020 may be adjusted based on identified objects 1010 with the video frame 1014. For example, if the gaze position 1020 is moving rapidly to the right with a high velocity and the eye tracking component 1018 determines the gaze position 1020 is headed to an object 1010 such as a person's face within the video frame 1014, then the gaze position 1020 may be adjusted to be on the person's face. The gaze position 1020 may be expressed as an x and y coordinate of the video frame 1014, which may comprise a plurality of bits.

The object detection component 1012 detects objects 1010 within video frames 1014 before they are transmitted to the mobile device 902. The objects 1010 may be identified such as by neural networks. The location and identification of the objects 1010 may be used by the eye tracking component 1018 and/or the encoding component 1008.

The encoding component 1008 selects different portions of the video frame 1014 to encode or compress at different levels 1017 of lossy compress. The encoding component 1008 performs methods that are in accordance with one or more lossy compression standards and may adjust parameters or levels 1017 of the lossy compression standards to encode or compress different portions 1007 of the video frame 1014 to generate the encoded video frame 1006.

A portion 1007 that includes the gaze position 1020 is compressed using a less lossy compression standard or a same lossy compression standard with parameters or levels 1017 that result in less loss in compressing, which results in higher fidelity to the original video frame 1014 when it is decoded or decompressed.

The human eye has higher visual fidelity in the center of the eye than the exterior, so details can be more easily distinguished in the center, so the encoding component 1008 encodes or compresses the portion 1007 of the video frame 1014 that includes the gaze position 1020 with a lower level 1017 than other portions 1007 of the video frame 1014.

The encoding component 1008 selects the portions 1007 and level 1017 for each of the portions 1007. In some examples, the portions 1007 are selected based on the gaze position 1020 with a first portion 1007 selected or determined that includes the gaze position 1020 and compressed using a lower level 1017. A second portion 1007 that does not include the first portion 1007 is selected or determined and compressed using a higher level 1017. A third portion 1007 may be selected that is further from the gaze position 1020 than the second portion 1007 and the third portion 1007 is compressed or encoded using a level 1017 that is higher than the level 1017 used in compressing the second portion 1007. Additional portions 1007 may be determined or selected with the portions 1007 that are farther away from the gaze position 1020 using a lossy compression standard that is more lossy or has a higher level 1017 the further from the gaze position 1020 the portion 1007 is. In some examples, different lossy compression standards are used on the different portions 1007.

The encoding component 1008 may extend a portion 1007 based on the objects 1010. For example, if a gaze position 1020 is determined to be on or near a person and there are other people nearby, then the portion 1007 may be extended to include the other nearby people. A portion 1007 may be extended for other reasons. For example, the encoding component 1008 may extend a portion 1007 that include the gaze position 1020 if a velocity or speed of the gaze position 1020 is very fast. The encoding component 1008 may extend the portion 1007 to attempt to ensure that the actual gaze position 1020 of the user of the mobile device 902 is encoded or compressed with the least lossy compression standard.

In some examples, the encoding component 1008 may include other portions 1007 of the video frame 1014 based on objects 1010 identified in the video frame 1014. For example, if an object 1010 appears to be significant to the story or appears to be of note or spectacular, then the encoding component 1008 may create a portion 1007 for the object 1010 and use a less lossy compression standard or lower level 1017 than would normally be used for the object 1010. For example, if there was a person on the left of the video frame 1014 and gaze position 1020 was on the right of the video frame 1014, but the gaze position 1020 had been on the person on the left in previous frames, then the encoding component 1008 may create a portion 1007 to include the person on the left and use a less lossy compression standard or lower level 1017 than would normally be used for the person on the left.

The encoding component 1008 selects the different lossy compression standards based on a bitrate of the communications 904 to ensure that the video frames 1014 can be streamed in real-time to a user of the mobile device 902.

Figure 11:
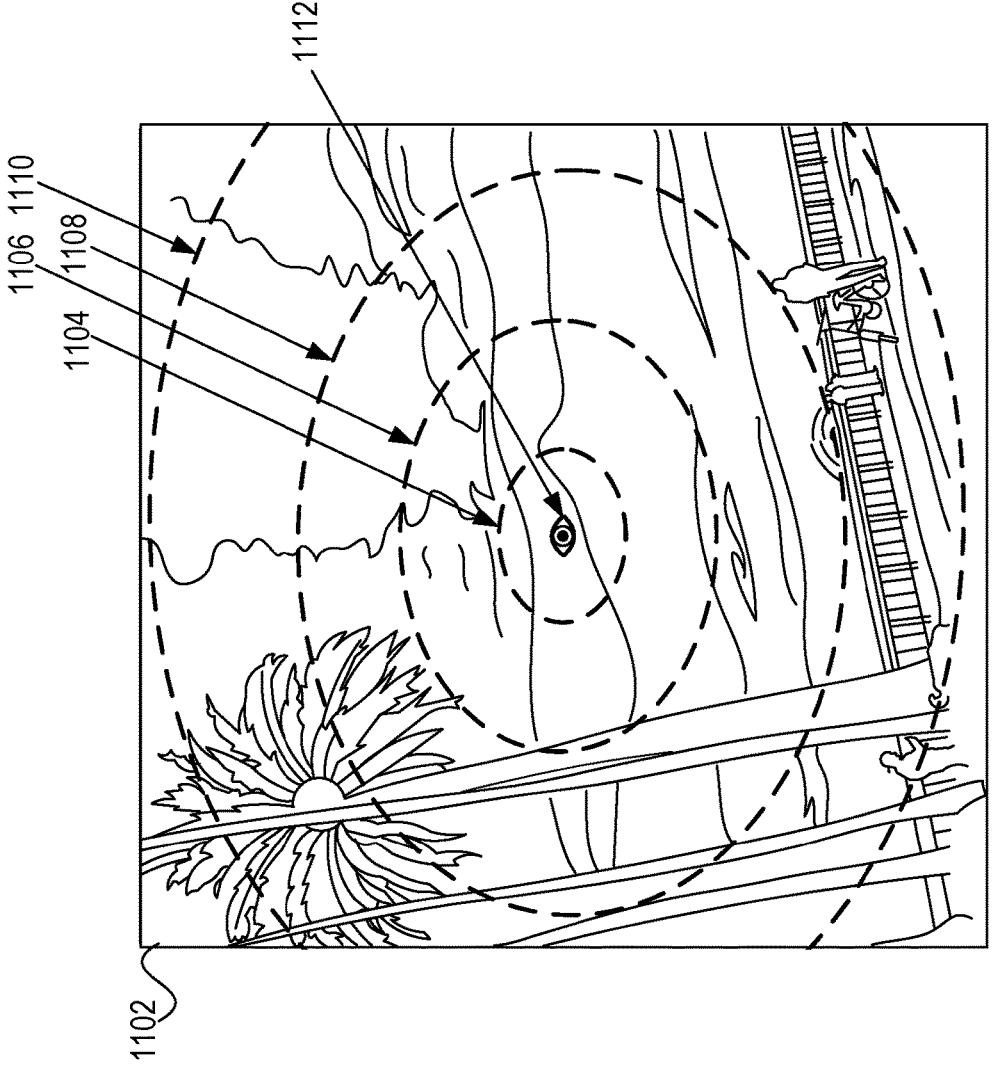
FIG. 11 illustrates portions of a compressed video frame, in accordance with examples.

FIG. 11 illustrates portions of a compressed video frame 1102, in accordance with examples. The video frame 1102 is a video frame 1014 of FIG. 10 or a video frame 910 of FIG. 9. Gaze position 1112 is a gaze position 1020 or a gaze position 918. The encoding component 1008 split the video frame 1102 into four portions 1104, 1106, 1108, 1110. Portion 1110 may include the remainder of the video frame 1102. Portion 1104 is encoded in accordance with a less lossy compression standard, a lower level 1017, than portions 1106, 1108, 1110. Portion 1106 is encoded in accordance with a less lossy compression standard than portions 1108, 1110. Portion 1108 is encoded in accordance with a less lossy compression standard than portion 1110. A user viewing the video frame 1102 who is focusing on gaze position 1020 may find the video frame 1102 to be acceptable to view despite the small distortions that may be present in portions 1106, 1108, 1110.

Figure 12:
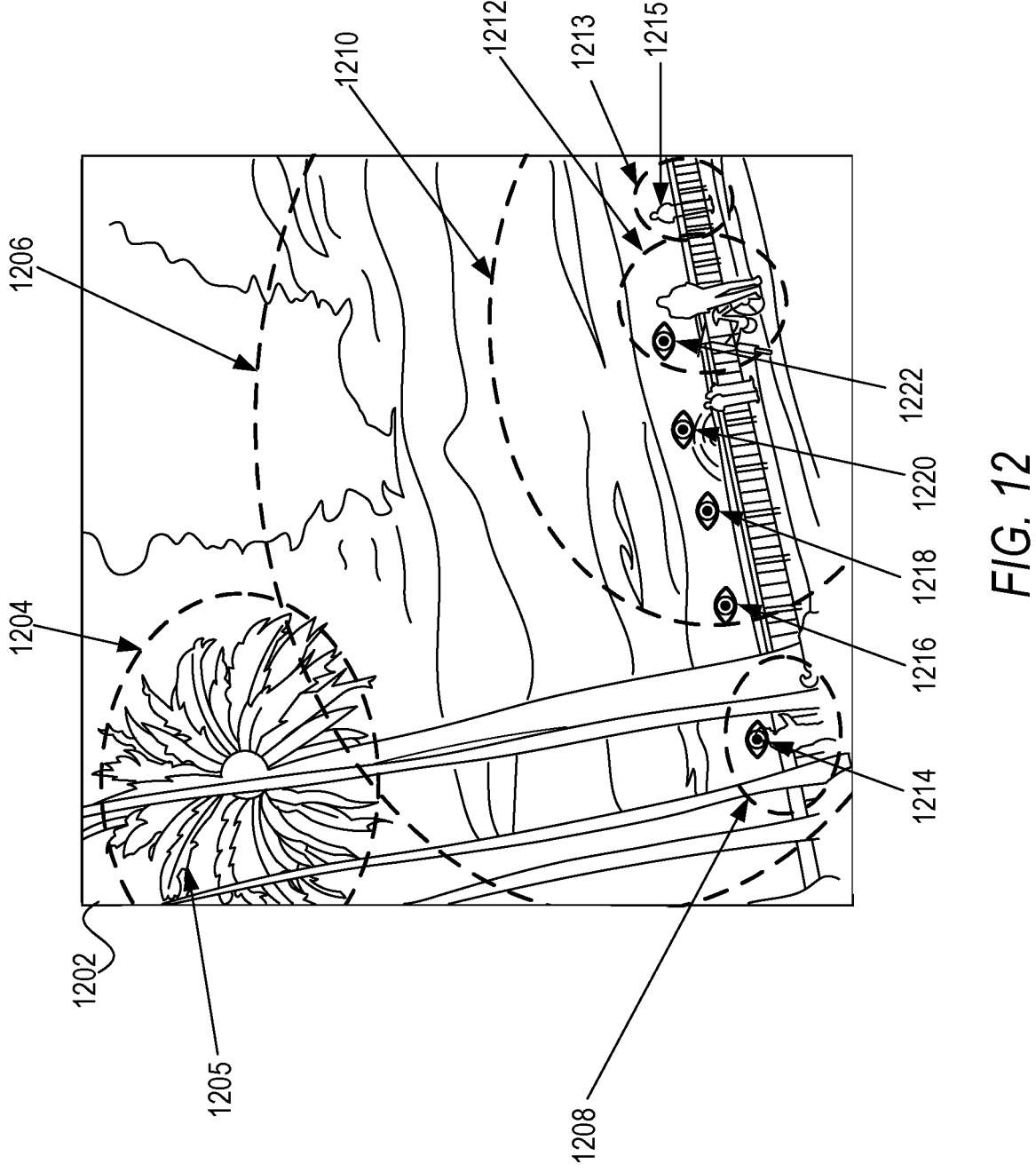
FIG. 12 illustrates portions of a compressed video frame, in accordance with examples.

FIG. 12 illustrates portions of a compressed video frame 1202, in accordance with examples. The video frame 1202 is a video frame 1014 of FIG. 10 or a video frame 910 of FIG. 9. Gaze positions 1214, 1216, 1218, 1220 are previous gaze positions for previous video frames. Gaze position 1222 is the last gaze position 1020 received by the server device 1002 and may be for the video frame 1014 right before video frame 1202 in a sequence of video frame 1014 that comprise a video.

The encoding component 1008 determines six portions 1204, 1206, 1208, 1210, 1212, 1213. Portions of the video frame 1202 not included in a portion 1204, 1206, 1208, 1210, 1212, 1213, may be encoded or compressed in accordance with a most lossy compression standard, or highest level 1017, used to compress the video frame 1202.

The encoding component 1008 determined a velocity of the gaze positions 1214, 1216, 1218, 1220, 1222, and determined to move the center of portion 1212 to the right because of the velocity of the gaze positions 1214, 1216, 1218, 1220, 1222, indicated the actual gaze position 918 of the user of the mobile device 902 when viewing the video frame 910 of the compressed video frame 1202 would be to the right of the gaze position 1222 because of the high velocity of the eye movement of the user. Portion 1212 is then encoded or compressed in accordance with a first lossy compression standard, or a lower level 1017. Portion 1213 is also encoded with the first lossy compression standard because it includes a person 1215 near the portion 1212 and there is another person within the portion 1212.

The encoding component 1008 also encodes portion 1208 in accordance with the first lossy compression standard because it includes a person where the user of the mobile device 902 was looking at with gaze position 1214. The encoding component 1008 encodes portion 1204 in accordance with a second lossy compression standard rather than a fourth lossy compression standard because portion 1204 is deemed to include an object 1205 that may be of interest to the user of the mobile device 902. The ordinal number of the lossy compression standard correspond to the level 1017 with lower levels indicating less lossy and higher numbers indicating more lossy. For example, the second lossy compression standard has a higher level 1017 than the first lossy compression standard but a lower level 1017 than the forth lossy compression standard.

The portion 1210 is encoded in accordance with a second lossy compression standard. Portion 1206 is encoded in accordance with a third lossy compression standard. A user viewing the video frame 1202 who is focusing on gaze position 1222 or to the right of gaze position 1222 may find the video frame 1202 to be acceptable to view despite the small distortions that may be present in portions 1210, 1206.

FIG. 13 illustrates a method 1300 for lossy video encoding for battery-constrained devices, in accordance with some examples. The method 1300 begins at operation 1302 with accessing a gaze location of a user viewing a first frame of a video on a wearable device. For example, a user of mobile device 902 may view a video frame 910 on a screen of the mobile device 902. The mobile device 902 determines the gaze position 918 and sends the gaze position 918 to the server device 1002 as gaze position 1020.

The method 1300 continues at operation 1304 with determining a first portion of a second frame based on the gaze location. For example, the encoding component 1008 determines portion 1104 of FIG. 11 based on the gaze position 1112.

The method 1300 continues at operation 1306 with compressing, in accordance with a first lossy compression standard, the first portion of the second frame to generate a first compressed portion of the second frame. For example, encoding component 1008 compresses the portion 1104 in accordance with a first lossy compression standard, a lower level 1017, to generate the portion 1007 of the encoded video frame 1006.

The method 1300 continues at operation 1308 with compressing, in accordance with a second lossy compression standard a second portion of the second frame, to generate a second compressed portion of the second frame, the second portion comprising a portion of the second frame not included in the first portion. For example, encoding component 1008 compresses the portion 1106 in accordance with a second lossy compression standard, a higher level 1017, to generate another portion 1007 of the encoded video frame 1006.

The method 1300 continues at operation 1310 with causing the first compressed portion and the second compressed portion to be sent wirelessly to the wearable device. For example, the encoded video frame 1006 is transmitted over communications 904 by the wireless component 1004 to the mobile device 902.

One or more of the operations of method 1300 can be optional. Method 1300 can include one or more additional operations. The operations of method 1300 can be performed in a different order. The method 1300 may be performed by a server device 1002 or an apparatus of the server device 1002.

FIG. 14 illustrates a method 1400 for lossy video encoding for battery-constrained devices, in accordance with some examples. The method 1400 begins at operation 1402 with causing a first frame of a video to be displayed on a display of the wearable device. For example, the mobile device 902 displays the video frame 910 on a screen for a user of the mobile device 902.

The method 1400 continues at operation 1404 with determining a gaze position of a user viewing the first frame. For example, the eye tracking component 920 of FIG. 9 determines the gaze position 918 while a user is viewing the video frame 910.

The method 1400 continues at operation 1406 with causing the gaze position to be transmitted to a server device. For example, the wireless component 906 transmits the gaze position 918 to the server device 1002.

The method 1400 continues at operation 1408 with accessing, an encoded video frame, the encoded video frame received from the server device, the encoded vide frame being a second frame of the video. For example, the wireless component 906 receives an encoded video frame 914 from the server device 1002 where the encoded video frame 914 is a second frame of a video.

The method 1400 continues at operation 1410 with decompressing, in accordance with a first lossy compression standard, a first portion of the encoded video frame to generate a first decompressed portion of the encoded video frame, the first portion determined based on the gaze position. For example, the decoding component 916 decodes a first portion 915 of the encoded video frame 914 in accordance with a first lossy compression standard.

The method 1400 continues at operation 1412 with decompressing, in accordance with a second lossy compression standard a second portion of the encoded video frame, to generate a second decompressed portion of the encoded video frame. For example, the decoding component 916 decompresses a second portion 915 of the encoded video frame 914 in accordance with a second lossy compression standard. In some examples, the first portion 915 and the second portion 915 comprise the video frame 910, which is the second video frame 910 of a video.

The method 1400 continues at operation 1414 with causing the first compressed portion and the second compressed portion to be displayed on a screen of the wearable device. For example, the video display component 908 displays the second video frame 910 on a screen of the mobile device 902 for consumption by a user of the mobile device 902.

One or more of the operations of method 1400 can be optional. For example, operation 1414 can be optional. Method 1400 can include one or more additional operations. The operations of method 1400 can be performed in a different order. Method 1400 may be performed by the mobile device 902 or an apparatus of the mobile device 902.

Example Statements

Example 1 is a system comprising: at least one processor; at least one memory component storing instructions that, when executed by the at least one processor, cause the at least one processor to perform operations comprising: accessing a gaze location of a user viewing a first frame of a video on a wearable device; determining a first portion of a second frame based on the gaze location; compressing, in accordance with a first lossy compression standard, the first portion of the second frame to generate a first compressed portion of the second frame; compressing, in accordance with a second lossy compression standard a second portion of the second frame, to generate a second compressed portion of the second frame, the second portion comprising a portion of the second frame not included in the first portion; and causing the first compressed portion and the second compressed portion to be sent wirelessly to the wearable device.

In Example 2, the subject matter of Example 1 includes, wherein the causing further comprises: causing an indication of the first lossy compression standard and an indication of the second lossy compression standard to be sent wirelessly to the wearable device.

In Example 3, the subject matter of any of Examples 1-2 includes, wherein the first lossy compression standard and the second lossy compression standard are a same lossy compression standard with the first lossy compression standard using parameters of the same lossy compression standard that generate the first compressed portion as less lossy than the second compressed portion.

In Example 4, the subject matter of any of Examples 1-3 includes, wherein determining the first portion is further based on a previous gaze location of the user viewing a third frame of the video on the wearable device, the third frame being a frame of the video before the first frame and before the second frame.

In Example 5, the subject matter of any of Examples 1-4 includes, wherein the operations further comprise: compressing, in accordance with a third lossy compression standard a third portion of the second frame, to generate a third compressed portion of the second frame, the third portion comprising a portion of the second frame not included in the first portion and not included in the second portion, and wherein the third portion is sent wirelessly to the wearable device.

In Example 6, the subject matter of any of Example 5 includes, wherein the first lossy compression standard, the second lossy compression standard, and the third lossy compression standard are a same lossy compression standard with the first lossy compression standard using parameters of the same lossy compression standard that generate the first compressed portion as less lossy than the second compressed portion, and wherein the second lossy compression standard uses parameters of the same lossy compression standard that generate the second compressed portion as less lossy than the third compressed portion.

In Example 7, the subject matter of any of Examples 1-6 includes, wherein the first portion and the second portion comprise an entire portion of the second frame.

In Example 8, the subject matter of any of Examples 1-7 includes, lossy compression standard, a Moving Picture Experts Group (MPEG) lossy compression standard, a Huffman Coding lossy compression standard, a Run-Length Encoding (RLE) lossy compression standard, a Lempel-Ziv-Welch (LZW) lossy compression standard, a Dictionary Coding lossy compression standard, or a proprietary lossy compression standard.

In Example 9, the subject matter of any of Examples 1-8 includes, wherein the operations further comprise: detecting objects in the second frame; compressing, in accordance with the first lossy compression standard, one or more of the objects to generate a compressed objects portion; and adding the compressed objects portion to the first compressed portion of the second frame.

In Example 10, the subject matter of any of Examples 1-9 includes, wherein the operations further comprise: before the compressing, in accordance with the first lossy compression standard, detecting objects in the second frame; and extending the first portion of the second frame based on one or more objects being near the first portion of the second frame.

In Example 11, the subject matter of any of Examples 1-10 includes, wherein the operations further comprise: before the determining the first of the second frame, adjusting the gaze location based on previous gaze locations.

In Example 12, the subject matter of any of Example 11 includes, wherein the adjusting is further based on one or more objects within the second frame.

In Example 13, the subject matter of any of Examples 1-12 includes, wherein the determining the first portion of the second frame is further based on a recorded gaze location, the recorded gaze location indicating a gaze location of a user when recording the first frame.

In Example 14, the subject matter of any of Examples 1-13 includes, wherein the operations further comprise: selecting the first lossy compression standard and the second lossy compression standard based on a bitrate of communications with the wearable device.

Example 15 is an apparatus of a wearable device comprising: at least one processor; at least one memory component storing instructions that, when executed by the at least one processor, cause the at least one processor to perform operations comprising: causing a first frame of a video to be displayed on a display of the wearable device; determining a gaze position of a user viewing the first frame; causing the gaze position to be transmitted to a server device; accessing, an encoded video frame, the encoded video frame received from the server device, the encoded video frame being a second frame of the video; decompressing, in accordance with a first lossy compression standard, a first portion of the encoded video frame to generate a first decompressed portion of the encoded video frame, the first portion determined based on the gaze position; decompressing, in accordance with a second lossy compression standard a second portion of the encoded video frame, to generate a second decompressed portion of the encoded video frame; and causing the first decompressed portion and the second decompressed portion to be displayed on a screen of the wearable device.

In Example 16, the subject matter of any of Example 15 includes, wherein the gaze position is a first gaze position, and wherein the operations further comprise: determining a second gaze position of the user viewing the second frame; and causing the second gaze position to be transmitted to the server device.

In Example 17, the subject matter of any of Examples 15-16 includes, wherein the first lossy compression standard and the second lossy compression standard are a same lossy compression standard with the first lossy compression standard using parameters of the same lossy compression standard that decompress the first portion as less lossy than the second portion.

Example 18 is a non-transitory computer-readable storage medium storing instructions that, when executed by at least one processor of a system, cause the at least one processor to perform operations comprising: accessing a gaze location of a user viewing a first frame of a video on a wearable device; determining a first portion of a second frame based on the gaze location; compressing, in accordance with a first lossy compression standard, the first portion of the second frame to generate a first compressed portion of the second frame; compressing, in accordance with a second lossy compression standard a second portion of the second frame, to generate a second compressed portion of the second frame, the second portion comprising a portion of the second frame not included in the first portion; and causing the first compressed portion and the second compressed portion to be sent wirelessly to the wearable device.

In Example 19, the subject matter of Example 18 includes, wherein the causing further comprises: causing an indication of the first lossy compression standard and an indication of the second lossy compression standard to be sent wirelessly to the wearable device.

In Example 20, the subject matter of Examples 18 or 19 includes, wherein the first lossy compression standard and the second lossy compression standard are a same lossy compression standard with the first lossy compression standard using parameters of the same lossy compression standard that generate the first compressed portion as less lossy than the second compressed portion.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Term Examples

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, network attached storage (NAS), storage area networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" may include, for example, a device accessed, controlled or owned by a user and with which the user interacts perform an action, engagement or interaction on the user device, including an interaction with other users or computer systems.

What is claimed is:

1. A system comprising:

at least one processor;

at least one memory component storing instructions that, when executed by the at least one processor, cause the at least one processor to perform operations comprising:

accessing at least one gaze location of a user viewing at least one previous frame of a video on a wearable device;

detecting objects in a next frame;

determining a gaze location for the next frame based on the at least one gaze location and at least one object of the objects;

determining a first portion of the next frame based on the gaze location and the at least one object;

compressing, in accordance with a first lossy compression standard, the first portion of the next frame to generate a first compressed portion of the next frame;

compressing, in accordance with a second lossy compression standard, a second portion of the next frame to generate a second compressed portion of the next frame, the second portion comprising a portion of the next frame not included in the first portion; and causing the first compressed portion and the second compressed portion to be sent wirelessly to the wearable device.

2. The system of claim 1, wherein the causing further comprises:

causing an indication of the first lossy compression standard and an indication of the second lossy compression standard to be sent wirelessly to the wearable device.

3. The system of claim 1, wherein the first lossy compression standard and the second lossy compression standard are a same lossy compression standard with the first lossy compression standard using parameters of the same lossy compression standard that generate the first compressed portion as less lossy than the second compressed portion.

4. The system of claim 1, wherein the operations further comprise:

compressing, in accordance with a third lossy compression standard, a third portion of the next frame to generate a third compressed portion of the next frame, the third portion comprising a portion of the next frame not included in the first portion and not included in the second portion, and wherein the third portion is sent wirelessly to the wearable device.

5. The system of claim 4, wherein the first lossy compression standard, the second lossy compression standard, and the third lossy compression standard are a same lossy compression standard with the first lossy compression standard using parameters of the same lossy compression standard that generate the first compressed portion as less lossy than the second compressed portion, and wherein the second lossy compression standard uses parameters of the same lossy compression standard that generate the second compressed portion as less lossy than the third compressed portion.

6. The system of claim 1, wherein the first portion and the second portion comprise an entire portion of the next frame.

7. The system of claim 1, wherein the first lossy compression standard and the second lossy compression standard are at least one of: an Advanced Video Coding (AVC) lossy compression standard, an H.264 lossy compression standard, a Moving Picture Experts Group (MPEG) lossy compression standard, a Huffman Coding lossy compression standard, a Run-Length Encoding (RLE) lossy compression standard, a Lempel-Ziv-Welch (LZW) lossy compression standard, a Dictionary Coding lossy compression standard, or a proprietary lossy compression standard.

8. The system of claim 1, wherein the operations further comprise:

compressing, in accordance with the first lossy compression standard, the at least one object to generate a compressed objects portion; and adding the compressed objects portion to the first compressed portion of the next frame.

9. The system of claim 1, wherein the operations further comprise:

extending the first portion of the next frame based on the at least one object being near the first portion of the next frame.

10. The system of claim 1, wherein the determining the first portion of the next frame is further based on a recorded gaze location, the recorded gaze location indicating a gaze location of a user when recording the at least one previous frame.

11. The system of claim 1, wherein the operations further comprise:

selecting the first lossy compression standard and the second lossy compression standard based on a bitrate of communications with the wearable device.

12. A non-transitory computer-readable storage medium storing instructions that, when executed by at least one processor of a system, cause the at least one processor to perform operations comprising:

accessing at least one gaze location of a user viewing at least one previous frame of a video on a wearable device;

detecting objects in a next frame;

determining a gaze location for the next frame based on the at least one gaze location and at least one object of the objects;

determining a first portion of the next frame based on the gaze location and the at least one object;

compressing, in accordance with a first lossy compression standard, the first portion of the next frame to generate a first compressed portion of the next frame;

compressing, in accordance with a second lossy compression standard, a second portion of the next frame to generate a second compressed portion of the next frame, the second portion comprising a portion of the next frame not included in the first portion; and causing the first compressed portion and the second compressed portion to be sent wirelessly to the wearable device.

13. The non-transitory computer-readable storage medium of claim 12, wherein the causing further comprises:

causing an indication of the first lossy compression standard and an indication of the second lossy compression standard to be sent wirelessly to the wearable device.

14. The non-transitory computer-readable storage medium of claim 12, wherein the first lossy compression standard and the second lossy compression standard are a same lossy compression standard with the first lossy compression standard using parameters of the same lossy compression standard that generate the first compressed portion as less lossy than the second compressed portion.

15. The non-transitory computer-readable storage medium of claim 12, wherein the operations further comprise:

compressing, in accordance with a third lossy compression standard, a third portion of the next frame to generate a third compressed portion of the next frame, the third portion comprising a portion of the next frame not included in the first portion and not included in the second portion, and wherein the third portion is sent wirelessly to the wearable device.

16. The non-transitory computer-readable storage medium of claim 15, wherein the first lossy compression standard, the second lossy compression standard, and the third lossy compression standard are a same lossy compression standard with the first lossy compression standard using parameters of the same lossy compression standard that generate the first compressed portion as less lossy than the second compressed portion, and wherein the second lossy compression standard uses parameters of the same lossy compression standard that generate the second compressed portion as less lossy than the third compressed portion.

17. The non-transitory computer-readable storage medium of claim 12, wherein the first portion and the second portion comprise an entire portion of the next frame.

18. A method comprising:

accessing at least one gaze location of a user viewing at least one previous first frame of a video on a wearable device;

detecting objects in a next frame;

determining a gaze location for the next frame based on the at least one gaze location and at least one object of the objects;

determining a first portion of the next frame based on the gaze location and the at least one object;

compressing, in accordance with a first lossy compression standard, the first portion of the next frame to generate a first compressed portion of the next frame;

compressing, in accordance with a second lossy compression standard, a second portion of the next frame to generate a second compressed portion of the next frame, the second portion comprising a portion of the next frame not included in the first portion; and causing the first compressed portion and the second compressed portion to be sent wirelessly to the wearable device.

19. The method of claim 18, wherein the causing further comprises:

causing an indication of the first lossy compression standard and an indication of the second lossy compression standard to be sent wirelessly to the wearable device.

20. The method of claim 18, wherein the first lossy compression standard and the second lossy compression standard are a same lossy compression standard with the first lossy compression standard using parameters of the same lossy compression standard that generate the first compressed portion as less lossy than the second compressed portion.

* * * * *